(12) United States Patent
Kumazawa et al.

(10) Patent No.: US 9,665,894 B2
(45) Date of Patent: May 30, 2017

(54) METHOD, MEDIUM, AND SYSTEM FOR RECOMMENDING ASSOCIATED PRODUCTS

(75) Inventors: Masami Kumazawa, Chigasaki (JP); Hideya Inoue, Yokohama (JP); Koji Yamagaki, Yokosuka (JP)

(73) Assignee: NIKON CORPORATION, Tokyo (JP)

( * ) Notice: Subject to any disclaimer, the term of this patent is extended or adjusted under 35 U.S.C. 154(b) by 131 days.

(21) Appl. No.: 13/529,429

(22) Filed: Jun. 21, 2012

(65) Prior Publication Data

US 2012/0259701 A1  Oct. 11, 2012

Related U.S. Application Data

(63) Continuation of application No. PCT/JP2010/073017, filed on Dec. 21, 2010.

(30) Foreign Application Priority Data

Dec. 24, 2009  (JP) ................. 2009-292857

(51) Int. Cl.
  *G06Q 30/00* (2012.01)
  *G06Q 30/06* (2012.01)
(52) U.S. Cl.
  CPC ................. *G06Q 30/0601* (2013.01)
(58) Field of Classification Search
  CPC ........... G06Q 30/0631; G06Q 30/0643; G06Q 30/0621; G06Q 30/00; G06T 1/00; G06F 17/30; A41H 43/00

(Continued)

(56) References Cited

U.S. PATENT DOCUMENTS 5,852,823 A * 12/1998 De Bonet ................. 382/279
7,766,221 B2    8/2010 Kasahara
(Continued)

FOREIGN PATENT DOCUMENTS

CN  101206749 A  6/2008
CN  101490705 A  7/2009
(Continued)

OTHER PUBLICATIONS

Feb. 2001—https://people.eecs.berkeley.edu/~malik/papers/MalikBLS.pdf.*
(Continued)

*Primary Examiner* — Matthew Zimmerman
(74) *Attorney, Agent, or Firm* — Oliff PLC

(57) ABSTRACT

A retrieval support system includes a database which stores commodity image data; a retrieval unit which acquires commodity image data having image characteristic information which is the same as or similar to image characteristic information indicating a characteristic in an image of input image data, from the database, with respect to the input image data; and a condition setting unit which sets a retrieval condition including at least one of time information relating to time, place information relating to places and occasion information relating to occasions. The retrieval unit performs retrieval of the commodity image data based on the retrieval condition set by the condition setting unit. The commodity image data acquired by the retrieval unit and information relating to a commodity different from a commodity corresponding to the commodity image data are output together.

15 Claims, 19 Drawing Sheets

(58) Field of Classification Search
USPC .............................................. 705/26.1, 27.1
See application file for complete search history.

(56) References Cited

U.S. PATENT DOCUMENTS

| | | | |
|---|---|---|---|
| 8,077,976 | B2 | 12/2011 | Shiiyama |
| 8,370,360 | B2 | 2/2013 | Mo |
| 8,392,281 | B1 * | 3/2013 | Bashir et al. ................ 705/26.7 |
| 2007/0122037 | A1 | 5/2007 | Shiiyama |
| 2007/0168357 | A1 | 7/2007 | Mo |
| 2007/0271146 | A1 * | 11/2007 | Nordmark .............. G06Q 30/02 705/26.8 |
| 2008/0177640 | A1 * | 7/2008 | Gokturk ................ G06Q 30/02 705/26.62 |
| 2009/0094260 | A1 * | 4/2009 | Cheng et al. ................. 707/100 |
| 2009/0144173 | A1 * | 6/2009 | Mo ........................ G06N 3/006 705/26.1 |
| 2009/0200366 | A1 | 8/2009 | Kasahara |
| 2010/0030578 | A1 * | 2/2010 | Siddique ............ G06Q 10/0637 705/3 |

FOREIGN PATENT DOCUMENTS

| | | |
|---|---|---|
| JP | 11-212991 A | 8/1999 |
| JP | 2002-150138 A | 5/2002 |
| JP | 2003-108593 A | 4/2003 |
| JP | 2004-246585 A | 9/2004 |
| JP | 2007-148677 A | 6/2007 |
| JP | 2008-225586 A | 9/2008 |
| JP | 2009-199561 A | 9/2009 |

OTHER PUBLICATIONS

International Search Report for Application No. PCT/JP2010/073017 mailed Mar. 22, 2011.
Written Opinion for Application No. PCT/JP2010/073017 mailed Mar. 22, 2011.
Extended European Search Report for Application No. 10839404.0 mailed Jun. 20, 2013.
Chinese Patent Office, The Second Office Action mailed Sep. 17, 2014 in Chinese Patent Application No. 201080058662.4 w/English-language Translation.
Mar. 10, 2015 Office Action issued in Japanese Patent Application No. 2011-547572.

* cited by examiner

FIG. 2A

| COMMODITY IDENTIFICATION INFORMATION | COMMODITY NAME | COMMODITY IMAGE DATA | CHARACTERISTIC INFORMATION | SHOP INFORMATION | PRICE | COMBINATION INFORMATION | TYPE IDENTIFICATION INFORMATION | USAGE INFORMATION |
|---|---|---|---|---|---|---|---|---|
|   |   |   |   |   |   |   |   |   |
|   |   |   |   |   |   |   |   |   |

FIG. 2B

| USAGE INFORMATION | | |
|---|---|---|
| TIME INFORMATION | PLACE INFORMATION | OCCASION INFORMATION |
| WINTER, NIGHT | YEAR END PARTY, EXPENSIVE RESTAURANT | SNOWY, FORMAL, BRIGHT, FRESH |

FIG. 3

| USER IDENTIFICATION INFORMATION | PURCHASE INFORMATION | PREFERENCE INFORMATION | POINT INFORMATION |
|---|---|---|---|
| | | | |
| | | | |

FIG. 8

| IDENTIFICATION INFORMATION / ATTRIBUTE INFORMATION | SIMILAR COMMODITY ITEM | CHARACTERISTIC DATA (VECTOR) | | | | | PRICE (YEN) | BRAND (MAKER) |
|---|---|---|---|---|---|---|---|---|
| | | RD | GD | BD | SHAPE | TEXTURE | | |
| A1 | a1-1~a1-q | #121 | #122 | #123 | #a01 | #b01 | 13000 | SHAPII |
| A2 | a2-1~a2-k | #124 | #125 | #126 | #a02 | #b02 | 150000 | VINE |
| A3 | a3-1~a3-r | #127 | #128 | #129 | #a03 | #b03 | 30000 | DOLL |
| ... | | | | | | | | |
| An | an-1~an-m | #1n7 | #1n8 | #1n9 | #a0n | #b0n | 25000 | TAMA |

FIG. 9

| ATTRIBUTE INFORMATION / IDENTIFICATION INFORMATION | SIMILAR COMMODITY ITEM | CHARACTERISTIC DATA (VECTOR) | | | | | PRICE (YEN) | BRAND (MAKER) |
|---|---|---|---|---|---|---|---|---|
| | | RD | GD | BD | SHAPE | TEXTURE | | |
| B1 | b1-1~b1-m | #221 | #222 | #223 | #c01 | #d01 | 1000 | TOMER |
| B2 | b2-1~b2-r | #224 | #225 | #226 | #c02 | #d02 | 8000 | VIEW |
| B3 | b3-1~b3-k | #227 | #228 | #229 | #c03 | #d03 | 13000 | PANPI |
| ..... | | | | | | | | |
| Bn | bn-1~bn-q | #2n7 | #2n8 | #2n9 | #c0n | #d0n | 5000 | MACKIE |

FIG. 10

| ATTRIBUTE INFORMATION / IDENTIFICATION INFORMATION | SIMILAR COMMODITY ITEM | CHARACTERISTIC DATA (VECTOR) | | | | | PRICE (YEN) | BRAND (MAKER) |
|---|---|---|---|---|---|---|---|---|
| | | RD | GD | BD | SHAPE | TEXTURE | | |
| C1 | c1-1~c1-q | #321 | #322 | #323 | #e01 | #f01 | 7000 | KUO |
| C2 | c2-1~c2-k | #324 | #325 | #326 | #e02 | #f02 | 1900 | TAZAKIYA |
| C3 | c3-1~c3-r | #327 | #328 | #329 | #e03 | #f03 | 13000 | BOOMA |
| ⋯ | | | | | | | | |
| Cn | cn-1~cn-m | #3n7 | #3n8 | #3n9 | #e0n | #f0n | 5000 | TORIICHI |

FIG. 11

| A1 GROUP | a1-1, a1-2, a1-3, ···, a1-m |
|---|---|
| A2 GROUP | a2-1, a2-2, a2-3, ···, a2-k |
| A3 GROUP | a3-1, a3-2, a3-3, ···, a3-l |
| ⋮ | |
| An GROUP | an-1, an-2, an-3, ···, an-q |

FIG. 12

| B1 GROUP | b1-1, b1-2, b1-3, ···, b1-k |
|---|---|
| B2 GROUP | b2-1, b2-2, b2-3, ···, b2-l |
| B3 GROUP | b3-1, b3-2, b3-3, ···, b3-q |
| ⋮ | |
| Bn GROUP | bn-1, bn-2, bn-3, ···, bn-m |

FIG. 13

| C1 GROUP | o1-1, o1-2, o1-3, ···, o1-m |
|---|---|
| C2 GROUP | o2-1, o2-2, o2-3, ···, o2-k |
| C3 GROUP | o3-1, o3-2, o3-3, ···, o3-l |
| ⋮ | |
| Cn GROUP | on-1, on-2, on-3, ···, on-q |

FIG. 14

| CATEGORY 1 (SHIRT) | CATEGORY 2 (TROUSERS) | CATEGORY 3 (JACKET) |
|---|---|---|
| a1-1 | b1-2 | c1-7 |
| a1-2 | b2-3 | c1-5 |
| a1-3 | b1-4 | c1-m |
| ⋮ | ⋮ | ⋮ |
| a1-m | b1-k | c1-6 |

FIG. 15

| ATTRIBUTE INFORMATION / IDENTIFICATION INFORMATION | SIMILAR COMMODITY ITEM | CHARACTERISTIC DATA (VECTOR) | | | | | | PRICE (YEN) | BRAND (MAKER) | USAGE INFORMATION |
|---|---|---|---|---|---|---|---|---|---|---|
| | | RD | GD | BD | SHAPE | TEXTURE | | | | |
| a1-1 | A1 | #191 | #192 | #193 | #a81 | #b81 | 2000 | TOTASHI | ..... |
| a1-2 | A1 | #194 | #195 | #196 | #a82 | #b82 | 50000 | BANI | ..... |
| a1-3 | A1 | #197 | #198 | #199 | #a03 | #b83 | 3500 | DOMAL | ..... |
| ...... | | | | | | | | | | |
| a2-1 | A2 | #191 | #192 | #193 | #a81 | #b81 | 2000 | TOTASHI | ..... |
| a2-2 | A2 | #194 | #195 | #196 | #a82 | #b82 | 50000 | BANI | ..... |
| a2-3 | A2 | #197 | #198 | #199 | #a03 | #b83 | 3500 | DOMAL | ..... |
| ...... | | | | | | | | | | |
| an-m | An | #1m7 | #1m8 | #1m9 | #a8n | #b8m | 85000 | TOSHIMA | ..... |

FIG. 16

| ATTRIBUTE INFORMATION / IDENTIFICATION INFORMATION | SIMILAR COMMODITY ITEM | CHARACTERISTIC DATA (VECTOR) | | | | | PRICE (YEN) | BRAND (MAKER) | USAGE INFORMATION |
|---|---|---|---|---|---|---|---|---|---|
| | | RD | GD | BD | SHAPE | TEXTURE | | | |
| b1-1 | B1 | #191 | #192 | #193 | #c81 | #b801 | 2000 | TOTASHI | ..... |
| b1-2 | B1 | #194 | #195 | #196 | #c82 | #b82 | 50000 | BANI | ..... |
| b1-3 | B1 | #197 | #198 | #199 | #c03 | #b83 | 3500 | DOMAL | ..... |
| b2-1 | B2 | #191 | #192 | #193 | #c81 | #b801 | 2000 | TOTASHI | ..... |
| b2-2 | B2 | #194 | #195 | #196 | #c82 | #b82 | 50000 | BANI | ..... |
| b2-3 | B2 | #197 | #198 | #199 | #c03 | #b83 | 3500 | DOMAL | ..... |
| bn-m | Bn | #1m7 | #1m8 | #1m9 | #a8m | #b8m | 85000 | TOSHIMA | ..... |

FIG. 17

| IDENTIFICATION INFORMATION / ATTRIBUTE INFORMATION | SIMILAR COMMODITY ITEM | CHARACTERISTIC DATA (VECTOR) | | | | | | PRICE (YEN) | BRAND (MAKER) | USAGE INFORMATION |
|---|---|---|---|---|---|---|---|---|---|---|
| | | RD | GD | BD | SHAPE | TEXTURE | | | | |
| c1-1 | C1 | #891 | #892 | #893 | #e81 | #f801 | 6000 | TOTASHI | ..... |
| c1-2 | C1 | #894 | #895 | #896 | #e82 | #f82 | 80000 | BANI | ..... |
| c1-3 | C1 | #897 | #898 | #899 | #e03 | #f83 | 13500 | DOMAL | ..... |
| ...... | | | | | | | | | | |
| c2-1 | C2 | #811 | #892 | #893 | #e81 | #f801 | 12000 | TOTASHI | ..... |
| c2-2 | C2 | #894 | #895 | #896 | #e82 | #f82 | 90000 | BANI | ..... |
| c2-3 | C2 | #897 | #898 | #899 | #e03 | #f83 | 23500 | DOMAL | ..... |
| ...... | | | | | | | | | | |
| cn-m | Cn | #8m7 | #8m8 | #8m9 | #e8m | #f8m | 125000 | TOSHIMA | ..... |

FIG. 19

| USER IDENTIFICATION INFORMATION | NAME | MAIL ADDRESS |
|---|---|---|
| U-1245 | ○○ | ○@xxx.com |
| U-1489 | □□ | □@xxx.com |
| U-3265 | ▽△ | ▽@xxx.com |

| USER IDENTIFICATION INFORMATION | | | |
|---|---|---|---|
| ACCESS TIME | IDENTIFICATION INFORMATION ABOUT PURCHASED COMMODITY ITEM | IDENTIFICATION INFORMATION ABOUT COMMODITY ITEM WHICH IS RETRIEVED BUT IS NOT PURCHASED | IDENTIFICATION INFORMATION ABOUT COMMODITY ITEM WHICH IS RECOMMENDED BUT IS NOT PURCHASED |
| 200X/07/14 | A2 | — | — |
| 200X/09/22 | B3, A5 | — | B2 |
| 200Y/01/07 | — | C2 | — |
| ⋯⋯ | | | |

METHOD, MEDIUM, AND SYSTEM FOR RECOMMENDING ASSOCIATED PRODUCTS

CROSS-REFERENCE TO RELATED APPLICATION

This is a Continuation Application of International Application No. PCT/JP2010/073017, filed Dec. 21, 2010, which claims priority to Japanese Patent Application No. 2009-292857, filed Dec. 24, 2009, The contents of the aforementioned applications are incorporated herein by reference.

BACKGROUND

Field of the Invention

The present invention relates to a retrieval support system, a retrieval support method and a retrieval support program.

Description of Related Art

In the related art, a system has been used which supports selection or determination of an object which a user desires to retrieve when the user retrieves and purchases an object (for example, a commodity or the like) through a network such as the Internet (refer to Japanese Unexamined Patent Application, First Publication No. 2004-246585, for example).

For example, the user inputs the name of the object (for example, a commodity name) or a characteristic of the object using a variety of retrieval engines on the Internet to retrieve the corresponding object. Further, the user retrieves a shop which sells the above-mentioned corresponding object, as necessary.

Further, a server device having such a retrieval engine provides an image or the price of the object in the retrieved shop corresponding to a user preference on the terminal of the user through the Internet, or provides a related object, for example, to support the object retrieval of the user.

Further, in recent years, in a case where a user purchases a commodity, the user does not go to a retail shop which makes face-to-face sales, but instead, frequently purchases the commodity from a virtual shop in a virtual mall on the Internet.

As a result, even in a district without large retail shops in the vicinity, the user can purchase a desired commodity from among a plurality of commodities of various types while at home (refer to Japanese Unexamined Patent Application, First Publication No. 2002-150138, for example).

SUMMARY

However, in the above-described examples in the related art, when the user retrieves the object, since the user inputs text data indicating the name or the like of the object or makes selection from the image of the object which is prepared for retrieval in advance, for example, in a case where the user does not have information other than the image of the object and does not know the name of the object, the user may not retrieve an object which the user actually desires to retrieve nor an object which is similar to the object to be retrieved.

An object of some aspects of the invention is to provide a retrieval support system, a retrieval support method and a retrieval support program which enables a user to retrieve a desired object.

According to an aspect of the invention, a retrieval support system is provided including: a commodity information database which stores image characteristic information about a commodity item which is combined for use in an image medium; a combination information database which stores information about the combination of each commodity item with a different commodity item which is combined for use with the commodity item; a similar item retrieval unit which acquires a commodity item having image characteristic information which is the same as or similar to image characteristic information about an input image, from the commodity information database; a combination retrieval unit which retrieves a different commodity item which is combined for use with the commodity item acquired by the similar item retrieval unit, from the combination information database; and a condition setting unit which sets a retrieval condition including at least one of time information relating to time, place information relating to places and occasion information relating to occasions, wherein at least one of the similar item retrieval unit and the combination retrieval unit may perform retrieval based on the retrieval condition set by the condition setting unit.

According to an aspect of the invention, a retrieval support method is provided including: a similar item retrieval process of acquiring a commodity item having image characteristic information which is the same as or similar to image characteristic information about an input image, from a commodity information database; a combination retrieval process of retrieving a different commodity item which is combined for use with the commodity item acquired in the similar item retrieval process, from a combination information database; and a condition setting process of setting a retrieval condition including at least one of time information relating to time, place information relating to places and occasion information relating to occasions, wherein in at least one of the similar item retrieval process and the combination retrieval process, retrieval may be performed based on the retrieval condition set in the condition setting process.

According to an aspect of the invention, a computer-executable retrieval support program is provided which causes operations to be executed in a computer, the operations including: a similar item retrieval process of acquiring a commodity item having image characteristic information which is the same as or similar to image characteristic information about an input image, from a commodity information database; a combination retrieval process of retrieving a different commodity item which is combined for use with the commodity item acquired in the similar item retrieval process, from a combination information database; and a condition setting process of setting a retrieval condition including at least one of time information relating to time, place information relating to places and occasion information relating to occasions, wherein in at least one of the similar item retrieval process and the combination retrieval process, retrieval may be performed based on the retrieval condition set in the condition setting process.

According to an aspect of the invention, a retrieval support system is provided including: a database which stores commodity image data; a retrieval unit which acquires commodity image data having image characteristic information which is the same as or similar to image characteristic information indicating a characteristic in an image of input image data, from the database, with respect to the input image data; and a condition setting unit which sets a retrieval condition including at least one of time information relating to time, place information relating to places and occasion information relating to occasions, wherein the retrieval unit may perform retrieval of the commodity image data based on the retrieval condition set by the condition setting unit, and wherein the commodity image data acquired by the retrieval unit and information relating to a commodity different from a commodity corresponding to the commodity image data may be output together.

According to an aspect of the invention, a retrieval support method is provided including: a condition setting process of setting a retrieval condition including at least one of time information relating to time, place information relating to places and occasion information relating to occasions; a retrieval process of retrieving commodity image data having image characteristic information which is the same as or similar to image characteristic information indicating a characteristic in an image of input image data, from a database, and acquiring the commodity image data based on the retrieval condition set in the condition setting process, with respect to the input image data; and a process of outputting together the commodity image data acquired in the retrieval process and information relating to a commodity different from a commodity corresponding to the commodity image data.

According to an aspect of the invention, a computer-executable retrieval support program is provided which causes operations to be executed in a computer, the operations including: a condition setting process of setting a retrieval condition including at least one of time information relating to time, place information relating to places and occasion information relating to occasions; a retrieval process of retrieving commodity image data having image characteristic information which is the same as or similar to image characteristic information indicating a characteristic in an image of input image data from a database, and acquiring the commodity image data based on the retrieval condition set in the condition setting process, with respect to the input image data; and a process of outputting together the commodity image data acquired in the retrieval process and information relating to a commodity different from a commodity corresponding to the commodity image data.

According to an aspect of the invention, a retrieval support system is provided including: a database which stores object image data relating to an object which is retrieved by a user; an extraction unit which extracts a retrieved part of input image data which is input; a retrieval unit which compares image characteristic information indicating a characteristic in an image of the image data in the retrieved part with image characteristic information indicating a characteristic in an image of the object image data in the database, and acquires object image data which matches or has a high similarity to the image data in the retrieved part from the database; and a condition setting unit which sets a retrieval condition including at least one of time information relating to time, place information relating to places and occasion information relating to occasions, wherein the retrieval unit may perform retrieval of the commodity image data based on the retrieval condition set by the condition setting unit.

According to an aspect of the invention, a retrieval support method is provided including: an extraction process of extracting a retrieved part of an object in input image data which is input; a condition setting process of setting a retrieval condition including at least one of time information relating to time, place information relating to places and occasion information relating to occasions; and a retrieval process of comparing the image data in the retrieved part with object image data stored in a database, extracting object image data which matches or has a high similarity to the image data in the retrieved part from the database, and extracting the commodity image data based on the retrieval condition set by the condition setting unit.

According to an aspect of the invention, a computer-executable retrieval support program is provided which causes an operation to be executed in a computer, the operation including: an extraction process of extracting a retrieved part of an object in input image data which is input; a condition setting process of setting a retrieval condition including at least one of time information relating to time, place information relating to places and occasion information relating to occasions; and a retrieval process of comparing the image data in the retrieved part with object image data stored in a database, extracting object image data which matches or has a high similarity to the image data in the retrieved part from the database, and extracting the commodity image data based on the retrieval condition set by the condition setting unit.

According to an aspect of the invention, a retrieval support system is provided including: a combination commodity database which stores attribute information about commodity items acquired from an image medium, for each category; a combination information database which stores information about combination of each commodity item with a different commodity item which is combined for use with the commodity item and is included in a different category; a commodity item database which stores attribute information about sales commodity items which are on sale; a similar item retrieval unit which selects a candidate group of commodity items which are the same as or similar to image data about a commodity input by a user and attribute information about the image data, from the combination commodity database; a combination retrieval unit which retrieves, corresponding to each commodity item in the candidate group, a different commodity item which is combined with the commodity item, from the combination information database; a commodity item retrieval unit which retrieves image data on the sales commodity item which is the same as or similar to image data on the different commodity item in a combination selected by the user from combinations of the commodity item and the different commodity item, according to the attribute information about the image data, from the commodity item database, and outputs the retrieved image data as a recommended commodity; and a condition setting unit which sets a retrieval condition including at least one of time information relating to time, place information relating to places and occasion information relating to occasions, wherein at least one of the similar item retrieval unit, the combination retrieval unit and the commodity item retrieval unit may perform retrieval based on the retrieval condition set by the condition setting unit.

According to an aspect of the invention, a retrieval support method is provided including: a similar item retrieval process of selecting a candidate group of commodity items which are the same as or similar to image data about a commodity input by a user and attribute information about the image data, from a combination commodity database which stores attribute information about commodity items acquired from an image medium, for each category; a combination retrieval process of retrieving, corresponding to each commodity item in the candidate group, a different commodity item which is combined with the commodity item, from a combination information database which stores information about combination of each commodity item with a different commodity item which is combined for use with the commodity item and is included in a different category; a commodity item retrieval process of retrieving a sales commodity item which is the same as or similar to image data on the different commodity item in a combination selected by the user from combinations of the commodity item and the different commodity item, according to attribute information about the image data, from a commodity item database which stores the attribute information about the sales commodity item, and outputting the retrieved sales commodity item as a recommended commodity; and a condition setting process of setting a retrieval condition including at least one of time information relating to time, place information relating to places and occasion information relating to occasions, wherein in at least one of the similar item retrieval process, the combination retrieval process and the commodity item retrieval process, retrieval may be performed based on the retrieval condition set in the condition setting process.

According to an aspect of the invention, a computer-executable retrieval support program is provided which causes an operation to be executed in a computer, the operation including: a similar item retrieval process of selecting a candidate group of commodity items which are the same as or similar to image data about a commodity input by a user and attribute information about the image data, from a combination commodity database which stores attribute information about commodity items acquired from an image medium, for each category; a combination retrieval process of retrieving, corresponding to each commodity item in the candidate group, a different commodity item which is combined with the commodity item, from a combination information database which stores information about combination of each commodity item with a different commodity item which is combined for use with the commodity item and is included in a different category; a commodity item retrieval process of retrieving a sales commodity item which is the same as or similar to image data on the different commodity item in a combination selected by the user from combinations of the commodity item and the different commodity item, according to attribute information about the image data, from a commodity item database which stores the attribute information about the sales commodity item, and outputting the retrieved sales commodity item as a recommended commodity; and a condition setting process of setting a retrieval condition including at least one of time information relating to time, place information relating to places and occasion information relating to occasions, wherein in at least one of the similar item retrieval process, the combination retrieval process and the commodity item retrieval process, retrieval may be performed based on the retrieval condition set in the condition setting process.

According to these aspects of the invention, a user can easily retrieve an object which the user desires to retrieve or an object which is similar to the object.

BRIEF DESCRIPTION OF DRAWINGS

FIG. 2A is a conceptual diagram illustrating a configuration example of a commodity table which is stored in a data base 16 in FIG. 1.

FIG. 2B is a conceptual diagram illustrating a configuration example of a commodity table which is stored in the data base 16 in FIG. 1.

FIG. 3 is a conceptual diagram illustrating a configuration example of a user registration table which is stored in the data base 16 in FIG. 1.

FIG. 8 is a table in which attribute information about combination commodity items of category 1 (shirt) in a commodity item database 26 in FIG. 7 is recorded.

FIG. 9 is a table in which attribute information about combination commodity items of category 2 (trousers) in the commodity item database 26 in FIG. 7 is recorded.

FIG. 10 is a table in which attribute information about combination commodity items of category 3 (jacket) in the commodity item database 26 in FIG. 7 is recorded.

FIG. 11 is a table indicating correspondence between sales commodity items of category 1 which are on sale and combination commodity items of category 1 which are similar thereto and are collected from an image medium.

FIG. 12 is a table indicating correspondence between sales commodity items of category 2 which are on sale and combination commodity items of category 2 which are similar thereto and are collected from an image medium.

FIG. 13 is a table indicating correspondence between sales commodity items of category 3 which are on sale and combination commodity items of category 3 which are similar thereto and are collected from an image medium.

FIG. 14 is a table illustrating combination between categories of combination commodity items collected from an image medium, in a combination information database 28 in FIG. 7.

FIG. 15 is a table in which attribute information about combination commodity items of category 1 (shirt) in a combination commodity image information database 29 in FIG. 7 is recorded.

FIG. 16 is a table in which attribute information about combination commodity items of category 2 (trousers) in the combination commodity image information database 29 in FIG. 7 is recorded.

FIG. 17 is a table in which attribute information about combination commodity items of category 3 (jacket) in the combination commodity image information database 29 in FIG. 7 is recorded.

FIG. 19 is a conceptual diagram illustrating a configuration of a user table in a history database 31 in FIG. 7.

FIG. 20 is a conceptual diagram illustrating a configuration of a purchase history table in the history table 31 in FIG. 7.

DESCRIPTION OP EMBODIMENTS

<First Embodiment>

Figure 1:
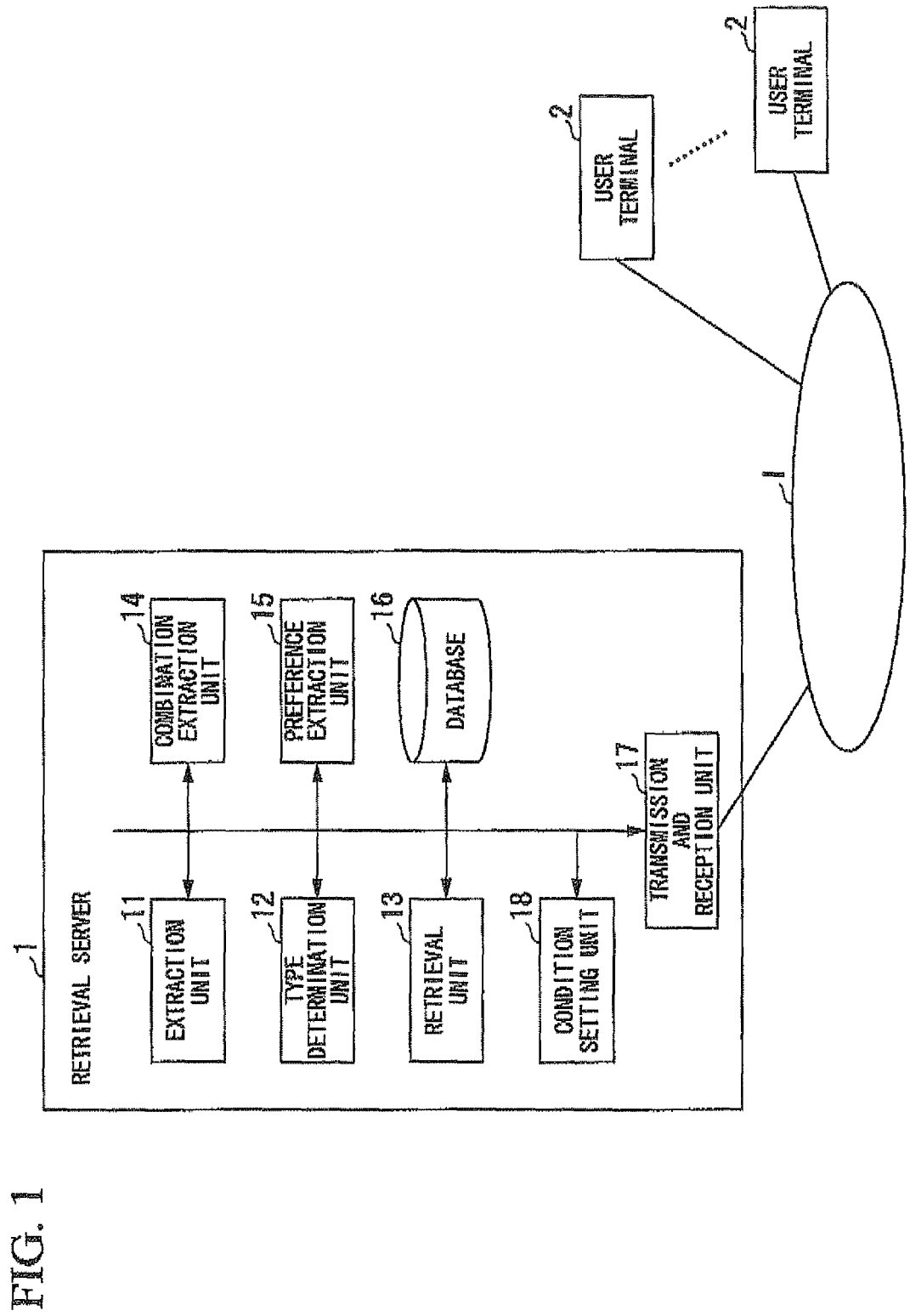
FIG. 1 is a block diagram illustrating a configuration example of a retrieval support system.

Hereinafter, a retrieval support system according to an embodiment of the invention will be described with reference to the accompanying drawings. FIG. 1 is a block diagram illustrating a configuration example of the retrieval support system according to the present embodiment.

In this figure, the retrieval support system includes a retrieval server 1, and user terminals 2 which are connected to the retrieval server 1 through an information communication network I such as the Internet.

Here, each of the user terminals 2 is a terminal used by a user, and is identified by user identification information of the user's own.

Hereinafter, in the present embodiment, retrieval and purchase of commodities such as fashion commodities, clothes, shoes, necklaces or hats (caps), as objects which a user desires to retrieve will be described by way of example. The present embodiment is not only applied to commodities such as fashion commodities, clothes, shoes, necklaces or hats (caps), but may be also applied to objects which can be retrieved through the Internet or a network, such as electrical appliances, furniture or pictures. Further, the objects in the present embodiment include commodities, articles, electrical appliances, furniture, pictures, buildings including shops or companies, plants, animals, real estate (appearance, interior or room arrangement of an apartment), views, or the like, for example.

The retrieval server 1 is a server which supports the commodity retrieval of the user in a shop or the like on the Internet, and includes an extraction unit 11, a type determination unit 12, a retrieval unit 13, a combination extraction unit 14, a preference extraction unit 15, a database 16, a transmission and reception unit 17 and a condition setting unit 18.

As shown in FIG. 2A, in the database 16, a commodity table is stored in which the name of each commodity, commodity image data which is image data of the commodity (object image data), characteristic information extracted from the commodity image data, information about a shop which sells the commodity, the price of the commodity, information about combination of the commodity with a different commodity to be combined with the commodity, type identification information indicating the type (commodity genre such as clothes, shoes, hats (caps) or necklaces) of the commodity, and usage information which is attribute information indicating usage are correspondingly matched with commodity identification information for identifying each commodity. For example, information about commodities from shops which are membership-registered in the retrieval support system is sequentially stored in the database 16. The characteristic information is obtained by converting elements such as colors, shapes, patterns or textures into numeric data (for example, a vector of dimensions corresponding to the number of elements). Further, in a case where based on an image of a commodity which the user desires to retrieve and a commodity image (object image) which is stored in the database 16 and the images are directly compared with each other, the type determination unit 12 may be omitted.

Further, time information, place information, occasion information and the like axe set as the usage information. As the time information, information relating to time such as a date, time, morning, forenoon, afternoon, night, season (spring, summer, autumn, winter, year around), national holiday, or seasonal festival such as Children's Day and Girls Festival is set. As the place information, information relating to places such as a domestic area, overseas country (place name such as Asia or Europe and America), park, resort, city, ocean, mountain, plateau, or expensive restaurant is set. Further, the occasion information includes information about commuting to work or school, part-time employment, going to a resort, going to town, welcome parties, farewell parties, domestic travel, overseas travel, driving, hiking, cycling, walking, year-end parties, new-year parties, joint parties, marriage meeting, divorce meetings, funerals, kindergarten entrance ceremonies, kindergarten graduation ceremonies, entrance ceremonies (of oneself or child), graduation ceremonies (of oneself or child), mountain climbing, sea bathing, going to a plateau, wedding receptions, company joining parties, graduation parties, wedding anniversaries, birthdays, barbecues, expensive restaurants or the like. Further, the type of clothes which the user would like to wear may be set as the occasion information, as necessary. For example, this type of clothes includes traditional, feminine, casual, sporty, dressy, career, formal, elegant, sweet, cool, casual Friday, cool business, warm business, character, stylish or the like. Further, as the occasion information, weather information which is information indicating weather, for example, clear, cloudy, rainy, snowy, typhoon, stormy or the like may be used. Further, as the occasion information, psychological information which is information relating to depth psychology, for example, feeling down, depressed, gloomy, nervous, sad, happy (excited), joyful, kind, calm, violent or the like may be used. Further, as the occasion information, influence information relating to impression on one's environment, for example, quite, dark, bright, kind, elegant, neat, healthy, feminine, manly, intelligent, friendly, fresh or the like may be used. FIG. 2B shows an example of usage information (time information, place information and occasion information) corresponding to a commodity.

Further, the condition setting unit 18 may be configured to divide the ranges of spring, summer, autumn and winter which are set therein in advance according to months and dates, and to change the date input as the time information to a season for use. For example, the seasons are divided so that spring corresponds to March 15 to June 14, summer corresponds to June 15 to September 14, autumn corresponds to September 15 to December 14, and winter corresponds to December 15 to March 14, and if August 10 is input as the time information, the condition setting unit 18 determines that the season is summer and uses the season as the usage information.

Further, the condition setting unit 18 may be configured to divide the time zones of early morning, forenoon, afternoon, and night according to time ranges, and to change the input time to a time zone for use. For example, the time zones are divided so that early morning corresponds to 4:00 am to 6:59 am, forenoon corresponds to 7:00 am to 11:59 am, afternoon corresponds to 0:00 pm to 4:59 pm, and night corresponds to 5:00 pm to 3:59 am, and if 10:10 am is input as the time information, the condition setting unit 18 determines that the time zone is forenoon and uses the time zone as the usage information.

The above-mentioned usage information is displayed as a combo box (for example, a combination of a rectangular region (text box) for character input and an item selection list (list box)) on a display screen of the user terminal 2, and is selected by a pointing device from the combo box. For example, if the usage information is clicked and selected by a mouse, the user terminal 2 sets an item of the usage information in the combo box which is clicked and selected as usage information selected by the user. The image information about the combo box displayed on the display screen of the user terminal 2 may be installed as an application program in the user terminal 2 in advance, or may be configured so that the user terminal 2 reads the image information about the combo box from the retrieval server 1 when a retrieval application starts up.

The extraction unit 11 receives input image data (image data provided from the user) which is transmitted from the user terminal 2 by the user through the transmission and reception unit 17 and extracts a retrieved part in the input image data. More specifically, the extraction unit 11 extracts the contour (retrieved part) of an image region of the commodity in the input image data and generates contour image data (image data in the retrieved part). Here, in the extraction process of the contour image data, the contour refers to a part in which the concentration of the image is rapidly changed, and a differential operation is performed to extract this part. However, since data is arranged at constant intervals in a digital image, the differential is approximated by an operation (calculus of finite differences) which calculates a difference between adjacent pixels, the part in which the concentration of the pixel is rapidly changed is extracted as the contour.

The type determination unit 12 retrieves template image data corresponding to the contour image data from template image data in a commodity contour data table which is stored in the database 16 in advance, based on the contour image data, and reads type identification information which is set in the database 16 corresponding to the template image data. The template image data is preferably stored in advance in the contour data table of the database 16 as a template in which a plurality of commodities of various types is image-captured from a plurality of angles and is compared with the contour.

In order to extract similar image data from a storage region of the type corresponding to the type identification information, the retrieval unit 13 extracts a characteristic of the retrieved image data subjected to the contour extraction in the input image data. The retrieval unit 13 retrieves characteristic information which matches or has a high similarity to the characteristic information obtained from the characteristic extraction from image data having type identification information corresponding to the determined type in the commodity table in the database 16, and extracts a predetermined number of pieces of image data on commodities having high similarity in the descending order of similarity. Here, in a case where the type determination unit 12 is not provided, the retrieval unit 13 compares the image of the commodity subject to the contour extraction in the input image data and the commodity image data in the overall commodity table and extracts commodity image data having high similarity to the image of the commodity subject to the contour extraction.

Further, the condition setting unit 18 reads the usage information transmitted from the user terminal 2 by the user with the input image data through the transmission and reception unit 17, and sets this usage information therein and outputs this usage information result to the retrieval unit 13.

Further, the retrieval unit 13 extracts the commodity image data in descending order in terms of similarity, from the image data having usage information input from the condition setting unit 18, when extracting the commodity image data in descending order of similarity as mentioned above.

Accordingly, the retrieval unit 13 retrieves commodities which are similar to the input image data and have usage information set by the user, from the commodity table. As a result, the retrieval unit 13 can extract commodities which have the preferred shape for the user and correspond to the usage of the user from the commodity table.

Further, the retrieval unit 13 reads commodity information (object information) corresponding to the retrieved commodity image data from the commodity table and transmits the result to the user terminal 2 of the user. The above-mentioned commodity information is information including at least one of a name (commodity name), a shop which sells the commodity corresponding to the commodity image data, a URL of the shop, a telephone number or address of the shop, and the price of the commodity.

The preference extraction unit 15 randomly extracts a predetermined number of pieces of image data on a different commodity (of the same type as that of the commodity retrieved by the user) included in the type of the commodity retrieved by the user from the commodity table, and then transmits the result to the user terminal 2.

The user terminal 2 displays the image data transmitted from the retrieval server 1 on a display screen (not shown).

Further, the preference extraction unit 15 receives an evaluation result (for example, a determination result such as preference or not) with respect to each commodity (for example, commodity image data stored in the database 16) transmitted from the user terminal 2, and writes to record preference information which includes at least one of shape, color, pattern and texture in a user registration table in the database 16, as shown in FIG. 3, for each user.

Here, purchase information (including purchased commodity identification information, purchase shops, purchase prices and the like) indicating commodities purchased in the past, and the preference information extracted by the preference extraction wait 15 and point information indicating the number of points possessed by the user are stored in the user registration table corresponding to the user identification information. These points may be used as cash at the time of payment for purchased commodities.

That is, in a case where discount coupon information is added to the above-mentioned shop information and the user purchases the retrieved commodity using the discount coupon information, the retrieval server 1 stores the purchase information relating to the commodity in the user registration table in the database 16. Further, the retrieval server 1 adds the points corresponding to the price of the purchased commodity for a target user in the user registration table as the number of points of the point information. The preference extraction unit 15 may extract preference information from the purchase information for each type.

The combination extraction unit 14 retrieves a commodity of a different type having a high possibility of being purchased in combination with the extracted commodity, that is, a commodity corresponding to combination information which is stored in advance corresponding to the preference information, and then transmits the result to the terminal of the user.

Figure 4:
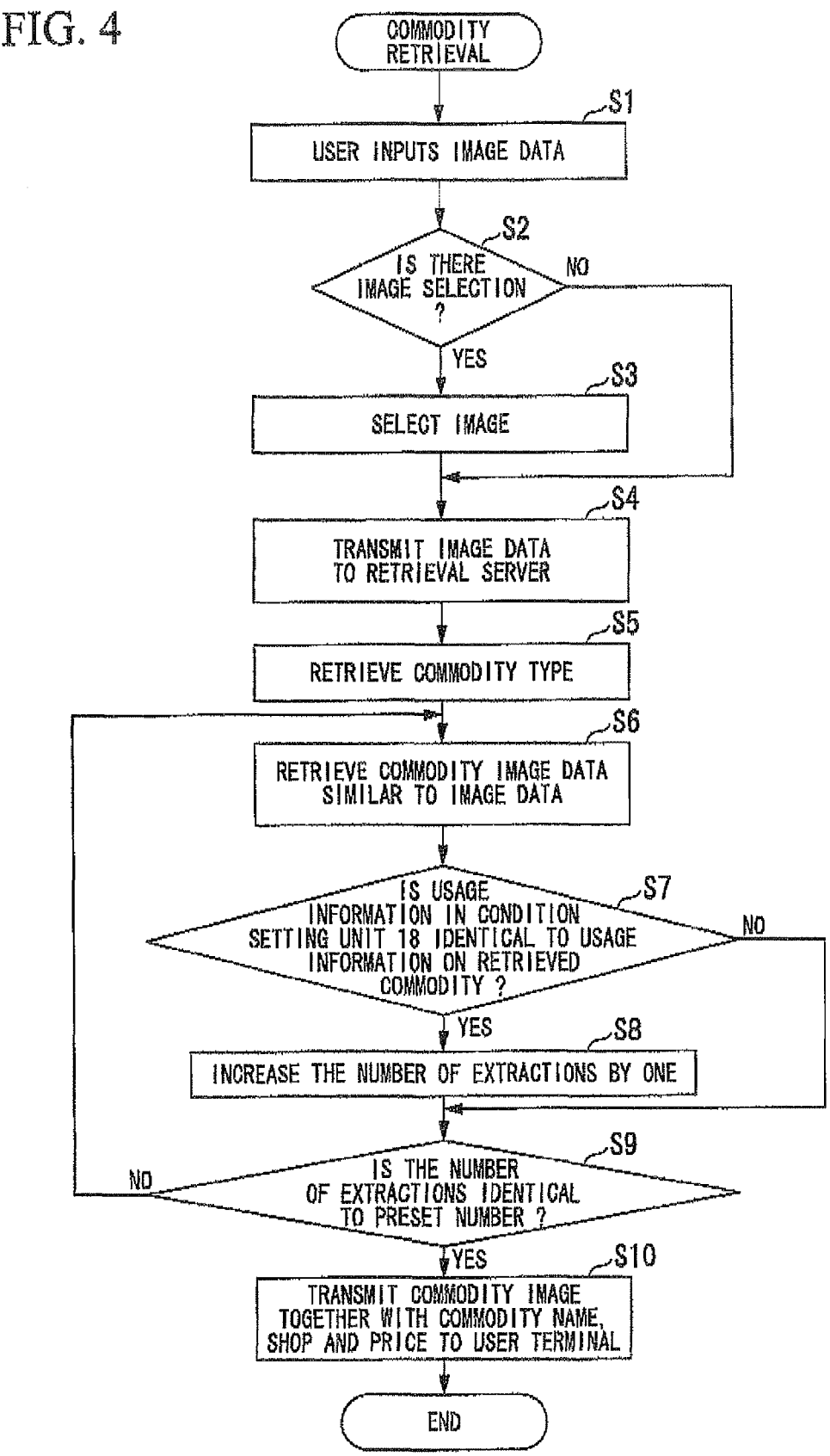
FIG. 4 is a flowchart illustrating an operation example of commodity retrieval in a retrieval support system.

Next, an operation of the retrieval support system according to the present embodiment will be described with reference to FIGS. 1 to 4. FIG. 4 is a flowchart illustrating an operation example of the retrieval support system according to the present embodiment. In the following description, a case where the type determination unit 12 is provided will be described. In a case where the type determination unit 12 is not provided, the process of the type determination unit 12 is omitted from the flowchart.

The user reads an image of a model who wears preferred clothes from a magazine or the like using a color scanner or the like which is connected to the user terminal 2, captures the image using a digital camera, or downloads an image from the Internet (step S1).

Then, the user inputs the read image, the captured image or the downloaded image to the user terminal 2 as input image data, and determines whether to select a region of an image of a commodity which the user desires to retrieve according to the presence or absence of a plurality of types of commodities in the input image data (step S2). Further, the input image data may be stored in the user terminal 2 in advance or may be stored in an external terminal.

Here, for example, when the user desires to retrieve the commodity name of a skirt and a shop which sells the commodity, if the input image data is obtained by image-capturing only the skirt, the procedure goes to step S4.

On the other hand, in a case where the model is totally captured instead of only the image of the skirt part, the procedure goes to step S3.

Further, the user marks the image of the region part of the skirt by a line or the like using an image processing tool (any tool may be used as long as it is capable of performing a process of drawing a line in the input image data) which is installed in the user terminal 2, in the input image data, to perform an image selection (step S3), and then, the procedure goes to step S4.

Further, at this time, the user inputs at least one of usage information used when the input image data is retrieved, for example, time information, place information and occasion information to the user terminal 2.

The user terminal 2 transmits the input image data (including data subject to image selection) which is input by the user and the usage information, in addition to user identification information of the user's own, to the retrieval server 1 through the information communication network I as a retrieval request signal (step S4).

In step S2 as described above, the user terminal 2 transmits the input image data (the entire image of the model) to the retrieval server 1 first. The retrieval server 1 determines whether the plurality of types of commodities is included in the input image data received from the user terminal 2, and extracts the plurality of types of determined commodities as images. Further, the retrieval server 1 may transmit data on the plurality of types of extracted images to the user terminal 2. In this case, in step S3, the user selects image data on types of commodities which the user desires to retrieve from the data on the plurality of types of images extracted from the input image data which is received from the retrieval server 1, and then the procedure goes to step S4.

Next, if the transmission and reception unit 17 in the retrieval server 1 receives the retrieval request signal from the user terminal 2, the transmission and reception unit 17 outputs the input image data described above to the extraction unit 11 and outputs registration information to the condition setting unit 18.

The extraction unit 11 performs a contour extraction (extraction of the retrieved part) of the commodity image in the input image data which is input from the transmission and reception unit 17.

Here, in a case where any region in the input image data is not marked, the extraction unit 11 performs extraction of the contour image data of the entire input image data. On the other hand, if there is a marked region part, the extraction unit 11 performs extraction of the contour image data on the image of the region part.

Further, the type determination unit 12 retrieves template image data corresponding to the contour image data, from the contour data table corresponding to the type of the commodity which is stored in the database 16 in advance, based on the contour image data, and reads type identification information corresponding to the template image data from the contour data table (step S5). Here, the retrieval unit 13 resets the number of commodities counted to zero as the extraction result to be transmitted to the user.

The retrieval unit 13 extracts a characteristic of the image data (retrieved image data) to be retrieved in the input image data in accordance with the inside of the contour in the contour image data, and retrieves commodity image data which is similar to characteristic information (for example, each information based on colors or shapes) about the retrieved image data from the commodity table of the database 16 (step S6).

Here, the retrieval unit 13 calculates the distance of a vector in each element (for example, if the characteristic information is information based on color, the element is blue, red, yellow or the like) of the characteristic information, and calculates similarity indicating whether the commodity image data matches this distance, or is close to or distant from this distance. If the commodity image data is close to this distance, the similarity is considered to be high, and the commodity image data having the highest similarity is extracted. Here, except for the commodity which has already been extracted as the commodity image data having the highest similarity and is stored as an internal comparison-completed file, the commodity image data having the highest similarity among the remaining commodities in the commodity table is extracted.

Next, the retrieval unit 13 compares the usage information which is set in the condition setting unit 18 with the usage information of the commodity corresponding to the extracted commodity image data, and determines whether or not they match each other (step S7).

Here, for example, the retrieval unit 13 compares a plurality of items (time information, place information and occasion information) of each usage information with items of the usage information which is set in the condition setting unit 18, and if at least one of the items matches, the retrieval unit 13 determines that the usage information about the extracted commodity and the usage information which is registered in the condition setting unit 18 match each other. Further, the retrieval unit 13 writes the commodity subject to comparison, that is, the extracted commodity having high similarity in the internal comparison-completed file, and the procedure goes to step S9 (step S8).

Further, the retrieval unit 13 stores (writes) commodity identification information about commodities having the same usage information in an internal extraction file as an extraction result, and increases the number of extractions indicating the number of commodities of the extraction result by one. On the other hand, in a case where the usage information does not match, the retrieval unit 13 does not perform the process of writing the commodity identification information about the commodity in the extraction file and the process of increasing the number of extractions by one, and the procedure goes to step S9 (step S7).

The retrieval unit 13 determines whether the number of extractions matches the number of commodities to be transmitted to the user which is set in advance (step S9), and in a case where the number of extractions matches the number of commodities to be transmitted to the user, the procedure goes to step S10. On the other hand, in a case where the number of extractions does not match the number of commodities to be transmitted to the user, the procedure goes to step S6.

Next, the retrieval unit 13 reads the commodity identification information about the retrieved commodity from the extraction file, reads commodity information (information including at least one of a commodity name, a commodity price, a commodity image data sales shop, a URL, a telephone number and an address of the shop) about the commodity corresponding to the commodity identification information from the commodity table, and transmits the result to the user terminal 2 of the user through the transmission and reception unit 17 (step S10). Here, as an example, the transmission and reception unit 17 reads an address on the network of the user terminal 2 added when the retrieval request signal is transmitted from the user terminal 2, and transmits the commodity information to the address.

Further, the user terminal 2 displays the information about the commodity name, the image data, the shop and the price which are the retrieval result, which is transmitted from the commodity sales retrieval server 1, on the display screen.

In step S5 as described above, in the user registration table in the database 16, only in a case where it is detected that the user identification information included in the retrieval request signal is registered in the user registration table, the retrieval server 1 may extract the commodity image data which is a retrieval target from the database 16 based on the input image data included in the retrieval request signal. Further, in a case where it is detected that the user identification information included in the retrieval request signal is not registered in the user registration table, for example, the retrieval server 1 may transmit the fact that user registration based on the user identification information is necessary, to the user terminal 2.

Thus, the user transmits image data on a preferred commodity and the usage information which is information about usage of the commodity to the retrieval server 1 from the user terminal 2, and thus, can obtain information about a name of the preferred commodity or a commodity which is similar to the commodity, shop information indicating a shop which sells the commodity, the price of the commodity, and the like, as an extraction result of the retrieval server 1.

In the present embodiment as described above, the user adds the usage information to the retrieval request information from the user terminal 2 for transmission, but the condition setting unit 18 may determine a material (cotton, wool, silk or cashmere) of the commodity retrieved from the input image data, and may determine the season (spring, summer, autumn or winter) which is time information, or the like from the material or may extract such a condition as occasion information from color or the like to use the result as the retrieval condition.

Further, the condition setting unit 18 may extract a figure from the input image data and may extract a retrieval condition from a background image of the figure to use the result as the retrieval condition. In this case, for example, the condition setting unit 18 may have a usage data extraction database, may specify a tree which is in the background image, may retrieve the same image from the usage data extraction database, and may determine season from the state of flowers and leaves or may determine place information or the like from character data which is in the background image.

Further, in the present embodiment as described above, the usage information is added as the attribute information about each commodity in the commodity table, but the commodity table may be configured for each category classification of the usage information. For example, each commodity table for spring, summer, autumn and winter may be configured for use. In this case, the retrieval unit 13 selects a commodity table corresponding to the registration information added to the retrieval request information from the user terminal 2 and retrieves a commodity similar to the input image data from the selected commodity table, thereby making it possible to reduce the retrieval time.

Here, in a case where the discount coupon information is added to the shop information and the retrieved commodity is purchased using the discount coupon information, the commodity sales retrieval server 1 charges the amount of money corresponding to the price of the commodity on the target shop.

Figure 5:
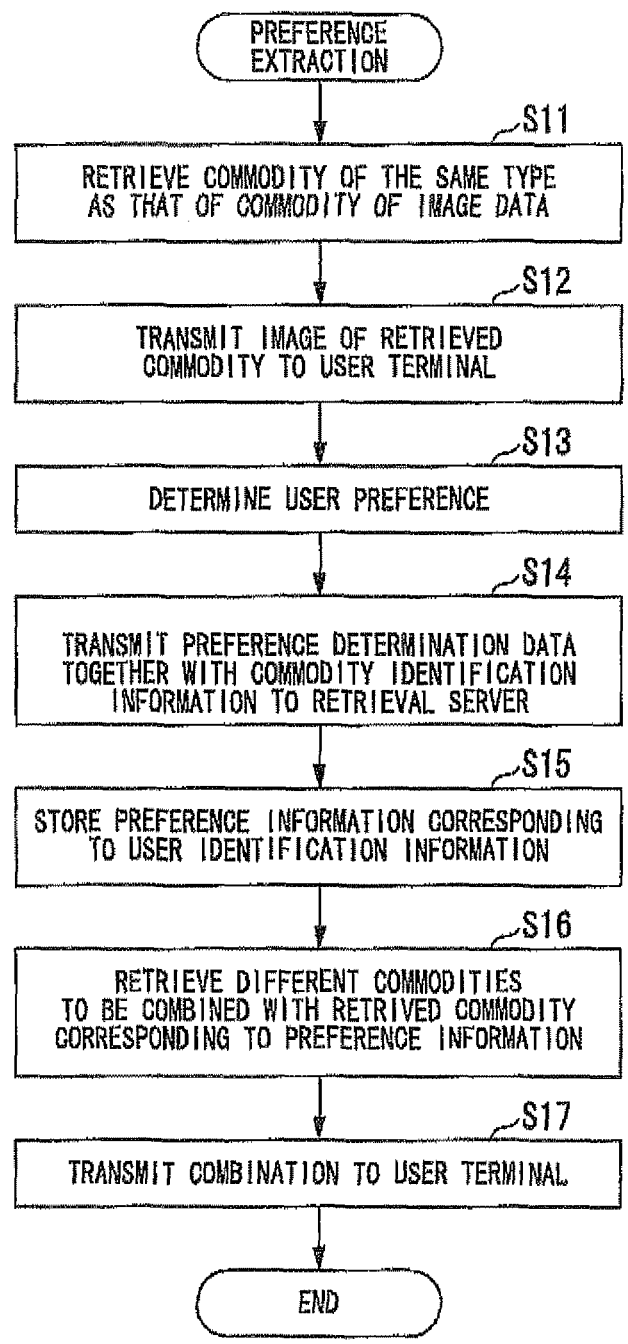
FIG. 5 is a flowchart illustrating an operation example of preference information collection in a retrieval support system.

Next, a process in which the retrieval server 1, according to the present embodiment, extracts user preference information and presents a different commodity capable of being combined with the retrieved commodity by the preference information will be described with reference to FIGS. 1 and 5. FIG. 5 is a flowchart illustrating an example of an operation of collecting user preference information and introducing a different commodity using the preference information.

The preference extraction unit 15 extracts commodities of the same type as the commodity retrieved by the user from the commodity table, that is, a preset number of shoes, for example, in a case where the commodity retrieved by the user is shoes (step S11), and transmits the commodity image data and the commodity identification information to the user terminal 2 (step S12).

Here, the commodity of each type which is transmitted to the user by the retrieval server 1 is a characteristic commodity which is different in color, shape, pattern or the like, and is set as a commodity from which a fashion coordinator is capable of extracting user preference information.

Further, if the user terminal 2 receives the commodity image data on the commodities for preference extraction from the retrieval server 1, the user terminal 2 sequentially displays the commodity image data (display image) of the commodities on the display screen.

Here, in the display image displayed on the display screen, the user clicks "like" using input means such as a mouse in a case where the user prefers the commodity of the displayed commodity image data, and clicks "dislike" using a mouse or the like in a case where the user does not prefer the commodity of the displayed commodity image data, for selection (step S13).

If the "like" or "dislike" is selected, the user terminal 2 displays commodity image data on the next commodity on the display screen, and continuously performs these processes with respect to all of the received commodity image data or a predetermined number thereof until the selection of the preference determination of the user is terminated.

If the preference determination for the above-mentioned commodity image data is terminated, the user terminal 2 transmits determination result information in which the preference determination data on the commodity is matched with each commodity identification information, in addition to user identification information of the user, to the retrieval server 1 (step S14).

If the determination result information is input, the transmission and reception unit 17 determines whether the added user identification information is registered in the user registration table. If the added user identification information is registered, the transmission and reception unit 17 outputs the determination result information to the preference extraction unit 15.

Next, if the determination result information is input, the preference extraction unit 15 selects preference information corresponding to the pattern of the preference determination from the preference information table in, the database 16.

Here, the pattern of the preference determination refers to a data pattern of "good" determination and "bad" determination corresponding to the commodity identification information which is arranged in a predetermined order.

Further, the preference extraction unit 15 writes and stores the obtained preference information in the user registration table in the database 16 corresponding to the user identification information (step S15).

Next, the combination extraction unit 14 selects combination information about a commodity corresponding to the above-mentioned preference information from a combination information table in the database 16. In the combination information table, for example, in a case where preference information about shoes in the combination information table is extracted, the combination extraction unit 14 selects combination information corresponding to clothes, bags, hats (caps) or the like corresponding to the preference.

In the combination information table, combinations between elements (shoes, clothes, bags, hats (caps) or the like) between categories of garment corresponding to the preference is stored in advance.

Further, the combination extraction unit 14 extracts commodity image data on clothes, bags, hats (caps) or the like which match or are similar to the combination information selected from the combination information table (extraction process of similar commodity retrieval using the above-mentioned characteristic information (combination preference information) (step S16), and transmits wearing image data on a model wearing the selected clothes, bag, hat (cap) or the like in combination with the shoes, that is, a single piece of wearing image data in a case where the number of combinations is only one and a plurality of types of wearing image data in a case where the number of combinations is more than one, to the user terminal 2, with combination identification information being added to each combination (step S17).

If the wearing image data is received, the user terminal 2 displays the wearing image data on the display screen. Thus, the user can obtain combination information about fashion corresponding to user's own preference with respect to the already retrieved or purchased commodity.

Here, as the user performs the preference determination as described above, the user terminal 2 transmits the preference determination data matched with each combination identification information to the retrieval server 1 as the determination result information, with the user identification information of the user being added thereto.

Further, if the determination result information is input, the transmission and reception unit 17 determines whether the added user identification information is registered in the user registration table. If the added user identification information is not registered, the transmission and reception unit 17 outputs the determination result information to the preference extraction unit 15.

The preference extraction unit 15 generates combination preference information by the preference determination pattern corresponding to the input combination identification information. The combination preference information includes combinations of shapes, colors, patterns and textures of different clothes, belts, hats (caps) or the like which corresponds to the shape, color, pattern, texture or the like of shoes and is subject to the "good" determination, and is subject to learning whenever the user purchases the commodity. Thus, the matching accuracy of the combination preference information used when commodities similar to each commodity included in the combination information are extracted and the user's preference is enhanced.

That is, if the user purchases a bag according to the combined wearing image data next time, preference information about the bag is retrieved and combination preference information about shoes, clothes, hats (caps) or the like corresponding to the preference information is obtained, and thus, the preference of each user is sequentially narrowed down.

Further, some commodities corresponding to combination information considered as discordant by a fashion coordinator may be randomly selected from the commodity table as a challenge combination (combination which is not normally selected by a user or combination which is different from the above-mentioned preference information), with respect to the combination information selected from the preference information, and these selected commodities may be inserted into some combinations when the wearing image data is generated.

Thus, the user's preference may be diversified, and thus, purchasing desire may be further increased.

Figure 6:
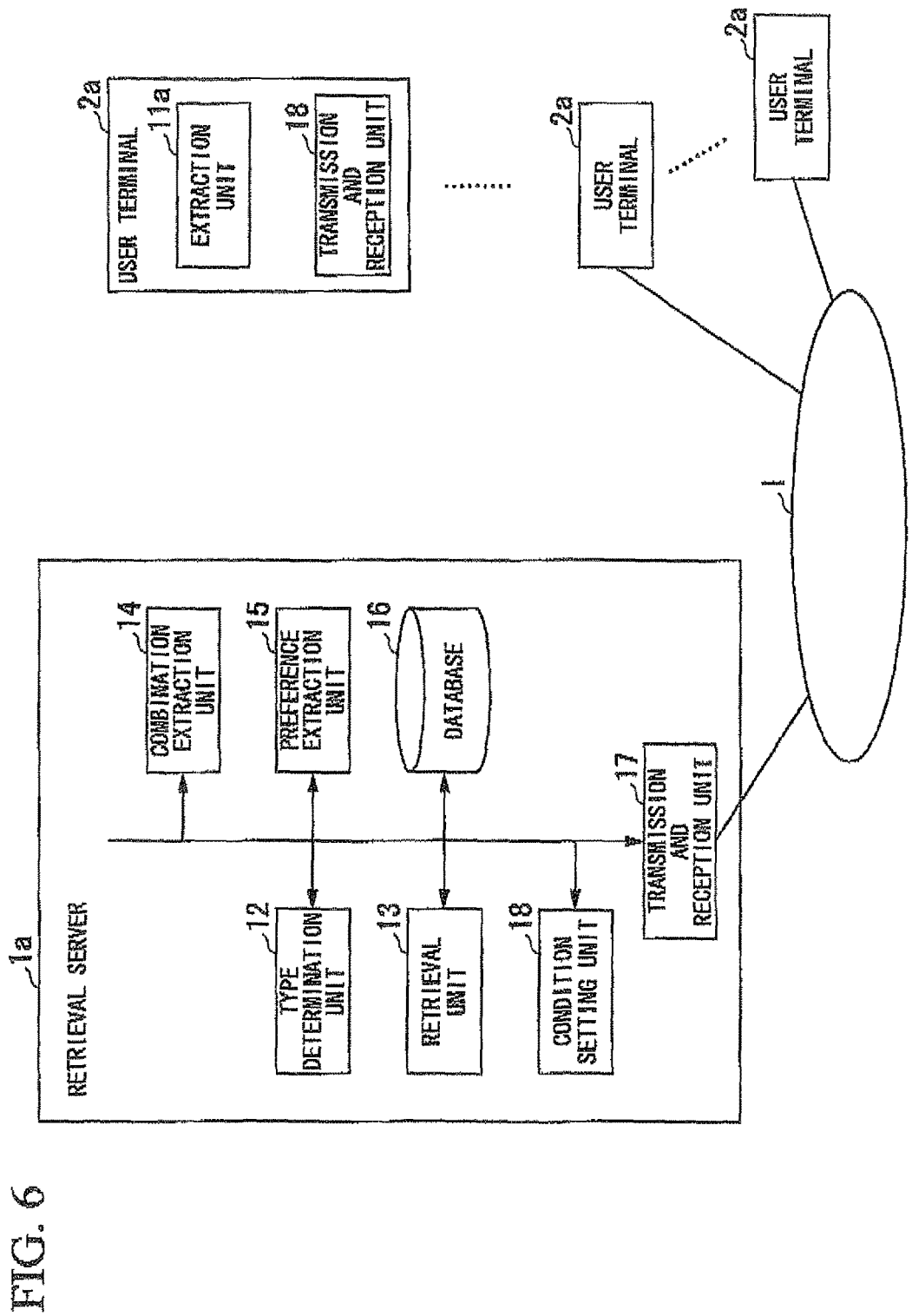
FIG. 6 is a block diagram illustrating a modification of a configuration example of a retrieval support system.

Further, as shown in FIG. 6, the retrieval support system according to the present embodiment may include a user terminal 2a in which the user terminal 2 includes an extraction unit 11a having the same extraction function as that of the above-mentioned extraction unit 11, and a retrieval server 1a which does not include the extraction unit 11. In this case, based on input image data obtained by the user terminal 2a or input image data stored in the user terminal 2a, the extraction unit 11a may extract a retrieved part (for example, commodity part) of the input image data and may transmit only image data corresponding to the retrieved part to the retrieval server 1a as input image data. Further, since this case is the same as the above-described embodiment except for the extraction unit 11a, description thereof will be omitted. In this way, the user may transmit only the image data corresponding to the retrieved part among the input data to the retrieved server 1a as image data to be transmitted, and thus, it is not necessary to transmit image data corresponding to a face part of the user or a face part of another person to the retrieval server 1a, for example.

The retrieval support system according to the present embodiment may be applied to the above-mentioned object, not limited to commodities such as clothes or shoes. Further, for example, the retrieval support system according to the present embodiment may be applied to service provided in accommodation facilities (hotels, inns, etc.), restaurants or the like. For example, in the above-mentioned accommodation facilities, the retrieval support system according to the present embodiment may be applied in selection of a combination of room arrangements, a combination of window views, a combination of rooms or room arrangements and window views, or the like. Further, for example, in the above-mentioned restaurants, the retrieval support system according to the present embodiment may be applied at a time of selecting a combination of restaurant interiors, a combination of window views, a combination of music, a combination of interiors and window views, a combination of interiors and music, a combination of window views and music, or the like.

<Second Embodiment>

Hereinafter, a retrieval support system according to an embodiment of the invention will be described with reference to the accompanying drawings.

In the related art, in a case where a user purchases combination commodities obtained by combining a plurality of commodities of different types, or in a case where the user performs selection from a large number of commodity groups in the virtual shop, the user performs commodity selection or purchase according to information personally collected (accessed through the Internet or the like) by the user.

For example, in a case where the user purchases combination commodities (for example, clothes, combination furniture, combination electrical appliances or the like) obtained by combining a plurality of commodities of different types (categories), and in a case where the user does not actually go to a retail shop, the user cannot directly hear information about a suitable combination from a clerk.

Further, in a case where the user selects a commodity which suits well in combination with a commodity purchased by the user or a commodity to be purchased from the large number of commodity groups of the virtual shop, since the user cannot ask about a combination commodity for a coordinator point by point and cannot perform selection by oneself, the user may not perform purchase.

As an example of this case, in garments, in a case where the user selects trousers or a shirt which suits a jacket to be purchased, the user performs selection or purchase based on information obtained personally from magazines or advisers (salesclerks, professionals or friends).

For example, in garments, even though the user wants to select the trousers or shirt which suits the jacket to be purchased, the user cannot confirm the combination commodity from a professional fashion coordinator, and may worry about selection of an unsuitable combination and give up purchase of suitable trousers or shirt.

Here, the term "garments" includes all clothes worn on a naked human body and accessories (accessories, bags, shoes, hats (caps) or the like).

The present embodiment can support retrieval by information providing or the like in a case where the user retrieves an object.

For example, in purchase of combination commodities, the present embodiment can extract a commodity which is suitable in combination with the commodity purchased or to be purchased by the user from the commodity groups to recommend the extracted commodity to the user, to thereby support purchase of the combination commodity of the user.

Figure 7:
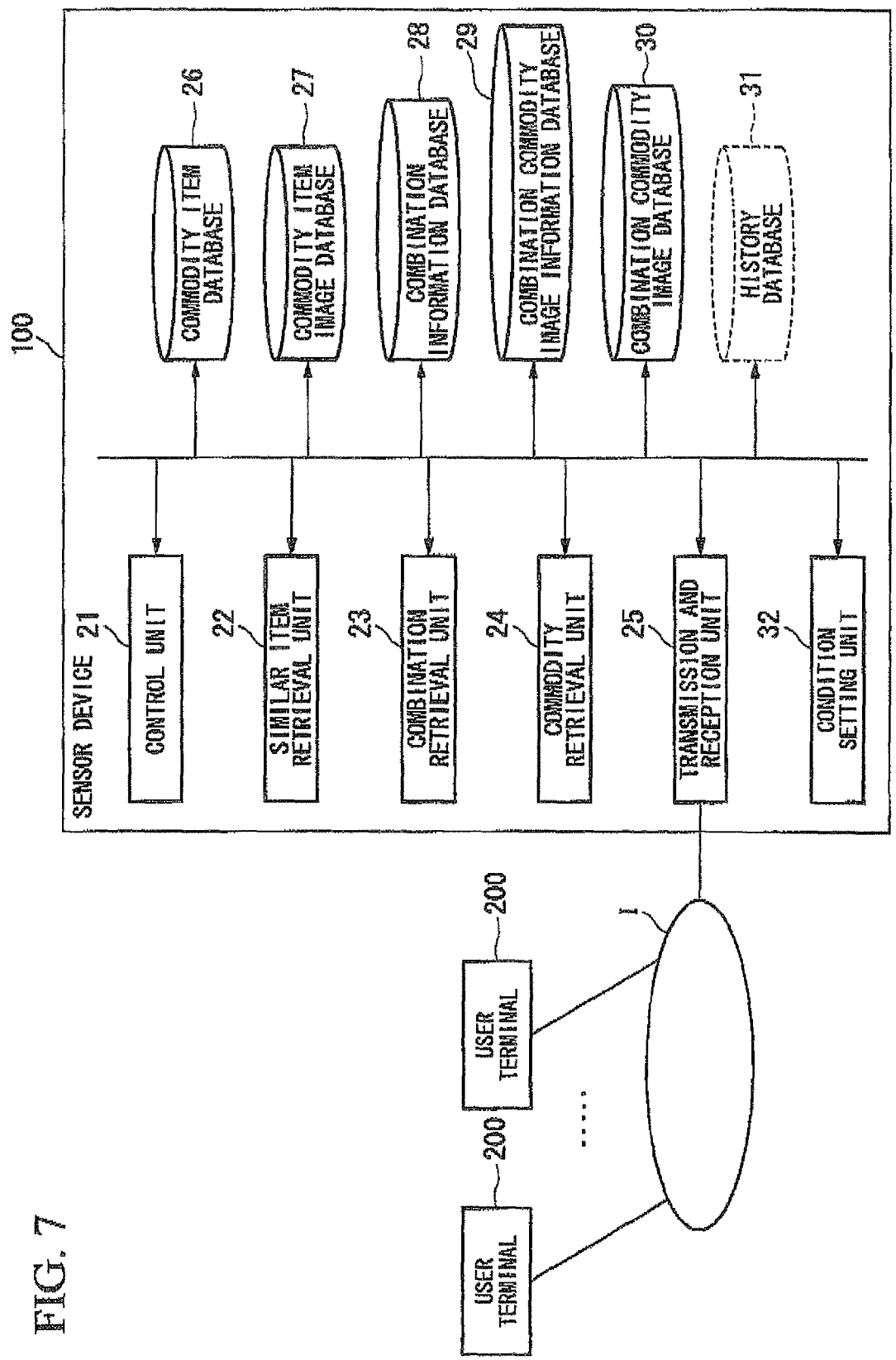
FIG. 7 is a block diagram illustrating a configuration example of a retrieval support system.

FIG. 7 is a block diagram illustrating a configuration example of the retrieval support system according to the present embodiment. The present embodiment relates to a system which presents, when a user purchases a sales commodity item of a certain category in commodity item combinations including sale commodity items of a plurality of categories, sales commodity items of the remaining categories in a commodity item combination which is considered to have a good combination with the purchased sales commodity item as recommended commodities, and supports the user to be able to easily select a sales commodity item which is considered to have a good combination with the sales commodity item to be purchased by the user from a variety of sales commodity items. In the following description, each commodity (commodity of a category such as a blazer, shirt, trousers or the like) in the garments is generally referred to as a commodity item, a commodity item which is actually on sale in a virtual shop is referred to as a sales commodity item, and each item which is combined in an image medium (which will be described later) is referred to as a combination sales item.

In the figure, the retrieval support system includes a commodity retrieval support device 100 and one or a plurality of user terminals 200. The commodity retrieval support device 100 includes a control unit 21, a similar item retrieval unit 22, a combination retrieval unit 23, a commodity retrieval unit 24, a transmission and reception unit 25, a commodity item database 26, a commodity item image database 27, a combination information database 28, a combination commodity image information database 29, a combination commodity image database 30 and a condition setting unit 32. The user terminal 200 is a personal computer which is provided with art Internet browser which is installed in each household of each user, for example. The commodity retrieval support device 100 and the user terminal 200 are connected to each other through an information communication network I which includes the Internet.

The commodity item database 26 has a storage region including a plurality of tables for each type of commodity item.

That is, as shown in FIG. 8, the commodity item database 26 has a storage region of a table configuration in which attribute information about sales commodity items which are on sale is stored for each identification information A1 to An of a commodity item of a shirt as category 1.

Further, similarly, as shown in FIG. 9, the commodity item database 26 has a storage region of a table configuration in which attribute information about corresponding sales commodity items is stored for each of identification information B1 to Bn of a commodity item of trousers as category 2.

Further, similarly, as shown in FIG. 10, the commodity item database 26 has a storage region of a table configuration in which attribute information about corresponding sales commodity items is stored for each of identification information C1 to Cn of a commodity item of a jacket as category 3

Further, although not shown, the commodity item database 26 has a storage region in which a plurality of tables such as shoes, blouses or bags is respectively stored as a different category of the garments, in addition to the above-mentioned respective categories.

Further, in each table of the commodity item database 26, a similar commodity item field is provided as one of the attribute information, and commodity items in the combination commodity image information database 29 which are the same as or similar to the sales commodity item are correspondingly stored as groups of commodity items which are similar to each sales commodity item, as shown in FIG. 11 (category 1—shirt), FIG. 12 (category 2—trousers) and FIG. 13 (category 3—jacket).

Here, in the commodity item database 26 (category 1 to category 3), the attribute information includes identification information about a corresponding combination commodity item (commodity sales item in the combination commodity image information database 29 (which will be described later)) which is considered to be the same or similar, characteristic data on an image extracted from the image data on the sales commodity item, sales information about the price, brand and the like of the sales commodity item, the usage information described in the first embodiment, and the like. The type of the image characteristic data and an acquisition method thereof will be described later.

In the commodity item image database 27, image data on each sales commodity item of each category which is stored in the commodity sales item database 26 is stored corresponding to the identification information about each sales commodity item.

The combination information database 28 stores therein, using as combination commodity items commodities of garments which a model wears in combination on the body in a fashion magazine, a fashion catalogue and an image medium on the Internet, that is, each of the commodity items which the model wears in combination, a combination of each correspondence relationship of the combination commodity items which are combined with each other, corresponding to each identification number. For example, in a case where a model wears commodity items such as a shirt corresponding to identification information a1-1, trousers corresponding to identification information b1-2, a jacket corresponding to identification information c1-7 in a fashion magazine, as shown in the first row in the combination information database 28 in FIG. 14, the combination commodity items among identification information a1-1, identification information b1-2 and identification information c1-7 are correspondingly stored as a set.

This combination information includes a combination of commodity items which are manufactured for combination by a fashion designer or a combination of commodity items which are manufactured by a fashion designer and are combined by a fashion coordinator as a combination of combination commodity items. Thus, the combination commodity items form a polished combination, and thus, in wearing this combination, a person who looks at this fashion may naturally accept the fashion without uncomfortable feeling.

The combination commodity image information database 29 is obtained by storing combination commodity items in garments obtained from a fashion magazine, a fashion catalogue and an image medium (data or device which presents images such as photos or illustrations in magazines) for designer's collection information on the Internet, according to categories. Here, the combination commodity image information database 29 is configured by table configurations as shown in FIGS. 15, 16 and 17.

FIG. 15 is a table in which the shirt as category 1 is stored as combination commodity items, FIG. 16 is a table in which the trousers as category 2 are stored as combination commodity items, and FIG. 17 is a table in which the jacket as category 3 is stored as combination commodity items. In the combination commodity image information database 29, identification information is given to the combination commodity items, and attribute information on a corresponding combination commodity item is stored for each piece of identification information. For example, the attribute information includes identification information about a similar sales commodity item, image characteristic data extracted from image data on a combination commodity item, sales information about the price, brand or the like of the combination commodity item, the usage information described in the first embodiment, and the like. The type and an acquiring method of the characteristic data will be described later.

Further, in each table of the combination commodity image information database 29, a field of a similar commodity items is provided as one of the attribute information, and a commodity item in the commodity item database 26 which is the same as or similar to the combination commodity item is correspondingly stored as shown in FIG. 15 (category 1—shirt), FIG. 16 (category 2—trousers) and FIG. 17 (category 3—jacket).

In the table of FIG. 15, in the combination commodity image information database 29, identification information a1-1 to a1-$q$ is stored as combination commodity items which are the same as or similar to a sales commodity item A1, identification information a2-1 to a2-$k$ is stored as combination commodity items which are the same as or similar to a sales commodity item. A2, and sequentially, identification information an-1 to an-m is stored as combination commodity item which are the same as or similar to a sales commodity item An.

Similarly, in the table of FIG. 16, in the combination commodity image information database 29, identification information b1-1 to b1-$m$ is stored as combination commodity items which are the same as or similar to a sales commodity item B1, identification information b2-1 to b2-$r$ is stored as combination commodity items which are the same as or similar to a sales commodity item B2, and sequentially, identification information bn-1 to bn-q is stored as combination commodity items which are the same as or similar to a sales commodity item Bn.

Similarly, in the table of FIG. 17, in the combination commodity image information database 29, identification information c1-1 to c1-$q$ is stored as combination commodity items which are the same as or similar to a sales commodity item C1, identification information c2-1 to c2-$k$ is stored as combination commodity items which are the same as or similar to a sales commodity item C2, and sequentially, identification information cn-1 to cn-m is stored as combination commodity items which are the same as or similar to a sales commodity item Cn.

In the combination commodity image database 30, image data on each combination commodity item of each category stored in the combination commodity image information database 29 is stored corresponding to each identification information about each combination commodity item.

Further, the above-mentioned commodity item database 26, the commodity item image database 27, the combination information database 28, the combination commodity image information database 29 and the commodity image database 30 may be classified according to gender, age, fashion tendency (for example, in the case of the male, casual, conservative, brother, adult, street, Ura-harajuku (Harajuku), mode, and in the case of a female, girl, sister, conservative, teen, celebrity or the like), and the like.

In such a classification, before a coordination process is performed, it is necessary to acquire gender, age (teens, twenties, thirties or the like), fashion tendency and the like from a user as classification information.

Returning to FIG. 7, the control unit 21 starts up as a virtual shop managed by itself is accessed from the user terminal 200, and obtains the classification information such as gender, age, fashion tendency and the like or transmits a processing program (which will be described later) for performing display and selection of a combination item (which is operated by a browser or the like of the user terminal) virtual shop to the user terminal 200. Here, the control unit 21 and the user terminal 200 perform transmission and reception of each piece of data through the information communication network I and the transmission and reception unit 25. The user terminal 200 starts up the processing program by an internal browser, and performs data transmission and reception with respect to the commodity retrieval support device 100 in an image display or a process of selecting a sales commodity item or a combination commodity item.

Further, if reply data for the image data is received from the user terminal 200, the control unit 21 selects any one commodity item table from the plurality of commodity item databases 26 corresponding to the gender, age and fashion tendency, and transmits category information indicating the category of the combination commodity item, for example, character information or image information about a shirt, trousers, a jacket, shoes or the like to the user terminal 200 through the transmission and reception unit 25 and the information communication network I.

Further, if category information indicating the type of the category selected by the user, for example, the shirt, which is transmitted from the user terminal 200, the control unit 21 selects the table shown in FIG. 8 which sets the shirt (category 1) as the commodity item database 26 as a category, reads in identification information A1 to An on the commodity items in the table, reads out image data on the commodity items of identification numbers A1 to An from the commodity item image database 27, converts the result into image data on thumbnail images (reduces the number of bits of image data), adds the identification number of each corresponding sales commodity item, and transmits the result to the user terminal 200.

Further, if the identification number of the sales commodity item which is selected for purchase from the thumbnail images by the user is input, the control unit 21 performs an order acceptance process for an order and transmits the input identification number to the similar item retrieval unit 22. Here, the order acceptance process includes a billing request corresponding to the price stored as attribute information, a stock confirmation of the ordered sales commodity item, a delivery procedure of the sales commodity item to an address input by the user, and the like, to the user terminal 200.

The condition setting unit 32 reads in the identification number of the thumbnail image selected by the user and usage information transmitted from the user terminal 200 through the transmission and reception unit 25, sets the usage information inside thereof, and outputs the usage information to the similar item retrieval unit 22. The configuration and operation of the condition setting unit 32 is the same as that of the condition setting unit 18 according to the first embodiment.

The similar item retrieval unit 22 retrieves the plurality of combination commodity items in which an identification number which matches the identification number of the input sales commodity item is written (set) in the field of the similar commodity item, from the table (category 1) of the combination commodity image information database 29, extracts the combination commodity item which is the same as or similar to the sales commodity item as a similar commodity item, and then outputs the result to the combination retrieval unit 23. Here, the similar item retrieval unit 22 selects the plurality of combination commodity items in which the identification number which matches the identification number of the input sales commodity item is written in the field of the similar commodity item from the table (category 1) of the combination commodity image information database 29, selects a commodity item having the same usage information as the usage information set in the condition setting unit 32, and extracts the result as the similar commodity item.

That is, the similar item retrieval unit 22 compares the usage information set in the condition setting unit 32 with the usage information about the commodity item in the combination commodity image information database 29 to determine whether they match each other. Here, for example, the similar item retrieval unit 22 compares a plurality of items (time information, place information and occasion information) of each piece of usage information with items of the usage information set in the condition setting unit 32. If at least one of the items matches, the similar item retrieval unit 22 determines that the usage information about the extracted commodity with the usage information registered in the condition setting unit 18.

The combination retrieval unit 23 retrieves a commodity item of a different category, for example, trousers (category 2), corresponding to each similar commodity item of the identification number input from the similar item retrieval unit 22 from the combination information database 28, extracts a corresponding combination commodity item, and then outputs the combination identification information as a second combination commodity item to the control unit 21.

Further, if the control unit 21 reads out image data corresponding to a plurality of combinations of identification information of the identification information about the similar commodity items input from the combination retrieval unit 23 and the identification information about the second combination commodity items from the combination commodity image database 30, corresponding to each piece of identification information, transmits the result to the user terminal 200, and outputs, if the user inputs the identification information about the combination commodity item in the selected combination, the received identification information to the commodity retrieval unit 24.

The commodity retrieval unit 24 retrieves a sales commodity item which is actually on sale, corresponding to the identification information about the input second combination commodity item, from the commodity item database 26, sales commodity sales commodity reads out as a recommend sales commodity item of a different category to be combined with the sales commodity item purchased by the user, image data of the recommend sales commodity item from the commodity item image database 27 according to the identification information, and then transmits the result to the user terminal 200.

Further, the commodity retrieval unit 24 compares the price of the sales commodity item which is recommended as a recommended commodity with the price of the sales commodity item purchased by the user, and determines whether the price of the recommended sales commodity item is in a set range (for example, within 0.5 to 2 times the price of the purchased combination commodity). Then, if the price of the recommended sales commodity item is the purchase price or lower, the commodity retrieval unit 24 may transmit the recommended commodity to the user terminal 200 and if the price of the recommended sales commodity item is out of the range, the commodity retrieval unit 24 may not transmit the recommended commodity.

Figure 18:
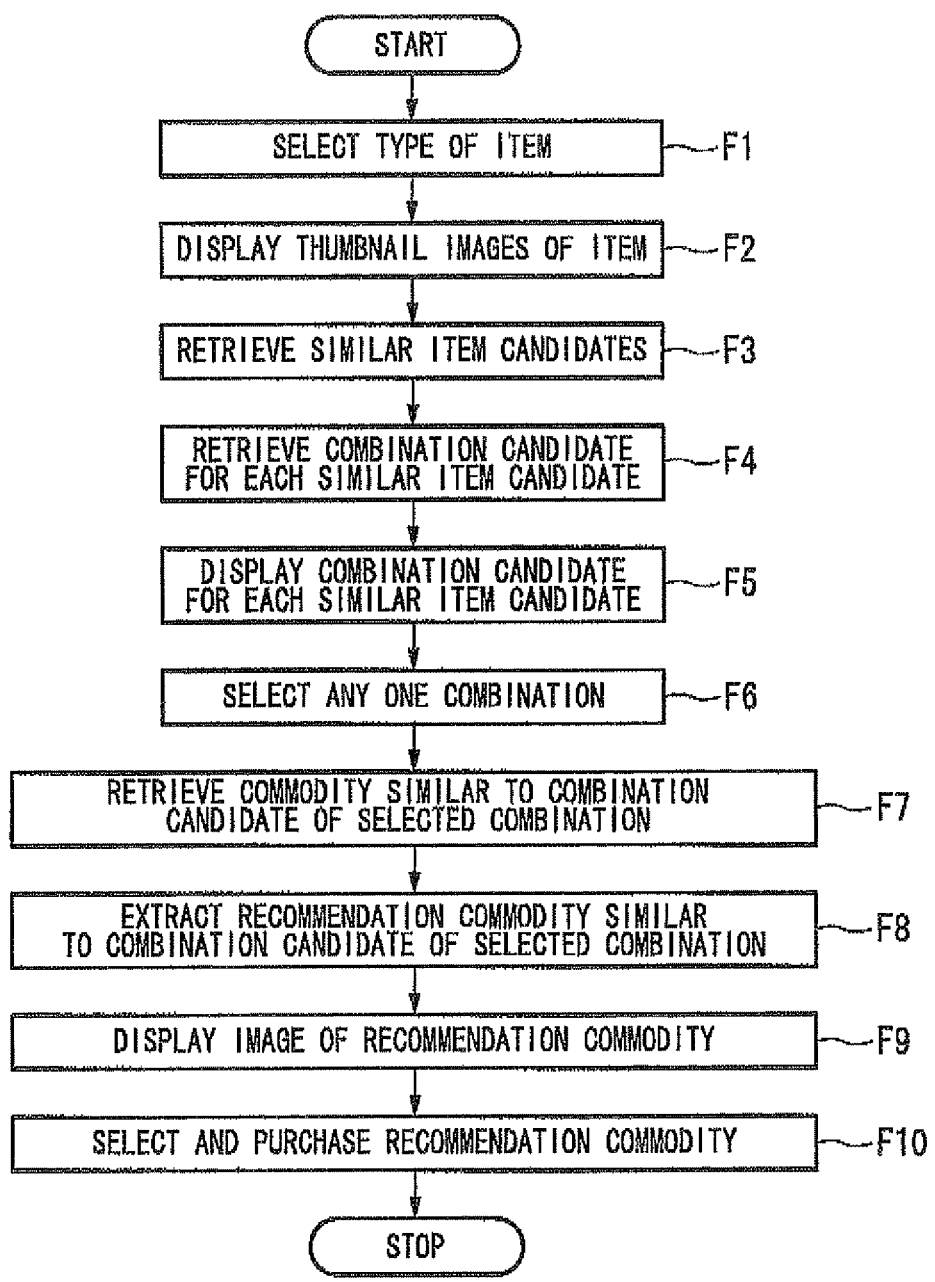
FIG. 18 is a flowchart illustrating an operation example of the retrieval support system in FIG. 7.

Next, the operation of the retrieval support system according to the present embodiment will be described with reference to FIGS. 7 and 18. FIG. 18 is a flowchart illustrating an operation example of the retrieval support system in FIG. 7. Hereinafter, a commodity input by a user is referred to as a commodity item, an item which is actually on sale in a virtual shop is referred to as a sales commodity item (commodity item in the commodity item database 26), a commodity extracted from an image medium used when a commodity combination is selected is referred to as a combination commodity item (commodity item in the combination commodity image information database 29).

If the user terminal 200 accesses the virtual shop managed by the commodity retrieval support device 100 through the information communication network I by the operation of the user, the control unit 21 transmits information for obtaining gender, age and fashion tendency, and a processing program of displaying a combination item (which will be described later) or performing a selection operation of the displayed image, to the user terminal 200. In the user terminal 200, an image display processing unit and a selection processing unit are provided by the processing program in the Internet browser, to display image data transmitted from the commodity retrieval support device 100 and to perform an editing process or a selection process of the image data.

Further, reply data (for example, data selected from a plurality of options displayed on the screen) for the gender, age and fashion tendency input to the screen data is received from the user terminal 200, the control unit 21 selects corresponding data from the plurality of tables of the commodity item database 26 corresponding to the gender, age and fashion tendency, and transmits category information indicating a category of the sales commodity item, for example, character information or image information about a shirt, trousers, a jacket, shoes or the like to the user terminal 200 through the transmission and reception unit 25 and the information communication network I.

If the character information or the image information is input, the user terminal 200 displays the category (for example, shirts, trousers, jackets or the like) according to the character information or the image information on the display unit, according to the processing program, and performs a display (for example, "Select") for urging the user to select any purchase.

If the user selects any category, the user terminal 200 transmits the category information indicating the category selected by the user, for example, category information indicating the shirt to the commodity retrieval support device 100 (step F1).

That is, if category information about a commodity item which the user desires to purchase is received, the control unit 21 selects the table shown in FIG. 8 in which the shirt is used as a category (category 1), from the table of the commodity item database 26 shown in FIGS. 8 to 10, reads in all of identification information A1 to An about sales commodity items in this table, reads out image data about sales commodity items of identification numbers A1 to An from the commodity item image database 27, uses the result as image data about thumbnail images, adds an identification number of a sales commodity item corresponding to each of thumbnail images, and then transmits the result to the user terminal 200.

If the image data about thumbnail images is supplied, the user terminal 200 displays the thumbnail images of the sales commodity items of identification numbers A1 to An on the display unit (step F2).

Further, if the user selects any one of the displayed thumbnail images and inputs the usage information, the user terminal 200 transmits the identification information about the selected thumbnail image and the usage information to the commodity retrieval support device 100.

If the identification information and the usage information about the selected thumbnail image is received, the control unit 21 performs an order process for an order of the sales commodity item of this identification number, that is, the shirt which is the sales commodity item selected by the user as a purchase object from the thumbnail images, and transmits the input identification number to the similar item retrieval unit 22.

Further, for example, if identification number A1 of the sales commodity item purchased by the user is input, the similar item retrieval unit 22 extracts commodity items in which identification number A1 is written in a similar commodity item which is the same as or similar to identification number A1 and usage information is the same, as a candidate group including one or a plurality of commodity items, from the table of the combination commodity image information database 29 shown in FIGS. 15 to 17 (step F3). For example, a commodity which is the same as a commodity which is written in the commodity item database 26, in which identification information A1 is written in a field of the identification information and A1 is written in a field of the similar commodity item, is also included in the commodity image information database 29.

Here, for example, if identification number A1 of the sales commodity item is input from the combination commodity image information database 29, the similar item retrieval unit 22 extracts combination commodity items of the identification numbers a1-1 to a1-$q$ in which identification number A1 is written in the field of the similar commodity item in the attribute data as the candidate group of the similar combination commodity items, and then outputs the result to the combination retrieval unit 23.

The combination retrieval unit 23 retrieves combination commodity items of a a different category, for example, trousers, corresponding to the combination commodity items of the identification numbers in the candidate group input from the similar item retrieval unit 22, from the combination information database 28 shown in FIG. 14, extracts corresponding combination commodity items of trousers (for example, b1-2, b2-3, b1-4, . . . corresponding to a1-1, a1-2, a1-3, . . . shown in FIG. 14), and outputs each piece of identification information in the combination as a second combination commodity item to the control unit 21 (step F4).

Here, the category recommended as sales commodity items which are combined with the sales commodity item purchased by the user may be set in advance corresponding to the purchased commodity, but may be initially selected by the user from the plurality of categories.

Here, after extracting the sales commodity items which are combined with the sales commodity item purchased by the user, the combination retrieval unit 23 may select a sales commodity item which matches the usage information set in the condition setting unit 32 from the extracted sales commodity items to be combined, and may set the selected sales commodity item as a final sales commodity item to be combined.

Further, the control unit 21 reads out image data corresponding to each of a plurality of (the number of combination commodity items corresponding to the candidate group) combinations of identification information including the identification information about the combination commodity items input from the combination retrieval unit 23 and the identification information about the second combination commodity items, corresponding to each piece of identification information, from the combined commodity image database 30, adds each piece of identification information to image data on each combination commodity item, and transmits the result to the user terminal 200.

If the plurality of combinations of identification information including the identification information about the combination commodity items (corresponding to the shirt) and the identification information about the second combination commodity items (corresponding the trousers) and each corresponding image data are input, the user terminal 200 displays the image data in each combination on the display unit (step F5).

Further, the user terminal 200 displays a plurality of three-dimensional human images corresponding to body forms created by CG (Computer Graphics) in an end part of the display screen and selects a certain image, and thus, overlaps the shirt and trousers of the combination commodity item with the human image for display. Further, the user terminal 200 may perform an image processing in which the user captures the user's face by a mounted web camera using an imaging device (not shown) and a face region selected by the user from the captured image data overlaps with a face part of the human image created by CG for display.

Next, if the user selects any one of a plurality of combinations displayed on the display unit of the user terminal 200 using a pointing device or the like (step F6), for example, if the user selects a combination of identification information a1-1 and identification information b1-2, the user terminal 200 transmits identification information b1-2 about the second combination commodity item (corresponding to the trousers) in the combination selected by the user to the commodity retrieval support device 100.

If the identification information b1-2 about the second combination commodity item is input through the control unit 21, the commodity retrieval unit 24 retrieves the table shown in FIG. 9 corresponding to the trousers category of the commodity item database 26 (step F7), and extracts a sales commodity item of identification information B1 corresponding to the identification information b1-2 (step F8).

Further, the control unit 21 retrieves and reads out image data corresponding to the identification information B1 about the combination sales commodity item extracted by the commodity retrieval unit 24 from the commodity item image database 27.

Further, the control unit 21 retrieves and reads out the image data corresponding to the identification information A1 purchased by the user from the commodity item image database 27, and transmits the result, in addition to the image data on the sales commodity item of the identification information B1, to the user terminal 200.

If the image data on the sales commodity item is supplied from the commodity retrieval support device 100, the user terminal 200 displays the image data on the supplied combination on the display unit (step F9).

Here, in a similar way to step F5 described above, the user terminal 200 displays a plurality of three-dimensional human images corresponding to body forms created by CG in an end part of the display screen and selects any one of the dace-dimensional human images (for example, a human image similar to the user), and thus, overlaps the shirt (identification information A1) and the trousers (identification information B1) of the combination commodity item with the selected three-dimensional human image for display. Further, the user terminal 200 may capture the user's face using a mounted web camera, and may overlap a face region selected by the user with a face part of the human image for display.

Further, if the user selects whether or not to purchase the recommended commodity of the sales commodity item of identification information B1 from options of the display screen (step F10), the user terminal 200 transmits information about the purchase or non-purchase, in addition to the identification information A1 and the identification information B1, to the commodity retrieval support device 100.

If the information indicating the purchase or non-purchase, and the identification information A1 and the identification information B1 are input, and if the information indicates the purchase, the control unit 21 performs the same order process as in the case of the sales commodity item of the identification information A1.

Further, a history database 31 indicated by a broken line in FIG. 7 may be provided in the commodity retrieval support device 100.

The history database 31 includes a user table having a table configuration shown in FIG. 19, and a purchase history table having a table configuration shown in FIG. 20 for each user.

The user table in FIG. 19 is configured by matching user identification information which identifies each user, given to each user, sales commodity with at least a user's name and mail address, corresponding to the user identification number, with respect to the users who are membership-registered or purchase the sales commodity items.

Further, the purchase history table in FIG. 20 is provided for each user, is identified according to the user identification information, and stores identification information about a sales commodity item purchased at the time of access to the virtual shop, identification information about a sales commodity item which is retrieved but not purchased, and identification information about a combination commodity item which is recommended with respect to the purchased sales commodity item but not purchased, as a history, in accordance with the access time to a virtual shop. If there is no purchased sales commodity item, "-" is stored. The data writing process for the user table and the purchase history table is performed by the control unit 21 as follows.

For example, if the user accesses the virtual shop from the user terminal 200 and inputs the user's name and mail address in the membership registration page to perform membership registration, the control unit 21 assigns user identification information to the user for additional registration in the user table.

Further, in a case where the user retrieves a sales commodity item in the selected category and purchases the sales commodity item, the control unit 21 stores the purchase sales commodity item in a region of the identification information about the purchased commodity item, and in a case where the user retrieves the sales commodity item but does not purchase the sales commodity item, the control unit 21 stores the identification information about the retrieved sales commodity item in a region of the identification information about the sales commodity item which is retrieved but not purchased.

Further, if the user purchases a sales commodity item as a recommended commodity which is combined with the purchased sales commodity item, the control unit 21 stores the purchased sales commodity item in the region of the identification information about the purchased commodity item, in the purchase history table, and in a case where the user does not purchase the sales commodity item as the recommended commodity, the control unit 21 stores the sales commodity item in a region of the identification information about the commodity item which is recommend but not purchased, in the purchase history table.

Further, in a case where the user accesses the virtual shop and retrieves a sales commodity items again, the control unit 21 selects the purchase history table of the user from the history database 31 according to the user identification information input by the user, and retrieves the selected purchase history table according to the identification information of the sales commodity item.

Here, in a case where the identification information about the sales commodity item which is retrieved by the user is detected in the region of the identification information about the purchased commodity item, the control unit 21 adds the date when the user purchases the same sales commodity item, transmits the result to the user terminal 200 to be displayed on the display screen, and notifies the already purchased combination commodity item to the user.

Further, in a case where the identification information about the sales commodity item which is being retrieved is detected in the region of the identification information about the commodity item which is retrieved but not purchased, the control unit 21 adds the time when the same sales commodity item is retrieved, transmits the result to the user terminal 200 to be displayed on the display screen, and notifies purchase motivation information such as "This is a commodity item retrieved before. Is this your favorite type?" to the user.

Further, in a case where the identification information about the sales commodity item which is being retrieved is detected in the region of the identification information about the commodity item which is recommended but not purchased, the control unit 21 adds the time when the same sales commodity item is recommended and the image data on the purchased sales commodity item at that time, transmits the result to the user terminal 200 to be displayed on the display screen, and notifies purchase motivation information such as "this is a commodity which is well combined with the commodity item purchased before" to the user.

Next, the characteristic data will be described. As shown in FIGS. 8 to 10 and FIGS. 15 to 17, the characteristic data is obtained through two-dimensional Fourier transform of a pattern of a texture of garments for each color space of R (red), G (green) and B (blue), for example. The control unit 21 generates element data RD, GD and BD of the characteristic data by two-dimensional Fourier transform. Here, if the sales commodity item or the combination commodity item corresponds to a shirt or jacket, data alignment in a process between the respective sales commodity items and combination commodity items is performed using the lateral width or the shoulder width of the clothes as a reference value of the length in the two-dimensional Fourier transform.

Further, lithe sales commodity item or the combination commodity item corresponds to trousers, data alignment in a process between the sales commodity items and combination commodity items is obtained using the lateral width of a waist part as a reference value of the length in the two-dimensional Fourier transform.

That is, in order to confirm the similarity by the characteristic data, and in order to correctly determine the size or the like of the pattern, it is necessary to standardize the size of each part of the entire using the size of any position of the accessory as a reference value, and to perform alignment of the two-dimensional Fourier transform result of the combination commodities in the same category. When image data in which two-dimensional Fourier transform is performed is captured, the shirt, jacket, trousers and the like are placed on a flat floor to be flattened and then are captured by a digital camera or the like.

Further, the shape of the element data of the characteristic data is the ratio of the length of a naked body to the shoulder breadth in the case of the shirt or jacket, and is the ratio of the fork and the bottom width in the case of trousers, for example.

Next, in the case of textures, a texture part having the largest area is enlarged, and then, the two-dimensional Fourier transform of the shape of the texture is performed. Here, data alignment of two-dimensional Fourier transform obtained from the image data between different combination items is achieved while maintaining a constant enlargement ratio.

As described above, a clerk of a virtual shop captures the image data on the garments, performs the Fourier transform or the like from the captured image data in the control unit 21 as described above, collects characteristic data from image data on sales commodity items which are on sale, and collects attribute data from image data on combination commodity items collected from a fashion catalogue or an image medium such as the Internet or the like.

Further, using characteristic data on the sales commodity items which are actually on sale as cluster central data, clustering of the combination commodity items collected from the image medium is performed for the combination commodity items having similarity. Here, the control unit 21 calculates the distance of a comparison characteristic vector which includes characteristic data of image data on each of the combination commodity items collected from the image medium input by the clerk and a reference characteristic vector which includes characteristic data of image data on each of the sales commodity items which are actually on sale. Then, the control unit 21 performs a process of setting the respective sales commodity items and combination commodity items respectively having a characteristic vector of a distance shorter than the reference characteristic vector of different combination commodity items as a cluster, having similarity to the sales commodity items, which is considered to be close, and generates the correspondence relationship between the combination commodity items in tables of FIGS. 15, 16 and 17 and the sales commodity items in the field of the similar commodity items.

Similarly, the correspondence relationship between the combination commodity items in tables of FIGS. 8, 9 and 10 and the sales commodity items in the field of the similar commodity items is generated. That is, the identification information disclosed in the field of the similar commodity items of the tables in FIGS. 8, 9 and 10 is identification information about combination commodity items having a short distance of the characteristic vector compared with the different sales commodity items which are on sale, with respect to the sales commodity items which are on sale, having corresponding identification information, that is, identification information about combination commodity items having similarity thereto.

Here, for example, the control unit 21 may arrange and store the identification information in each field of the similar commodity items in each of FIGS. 8, 9 and 10, in the ascending order of the distance of the characteristic vector, that is, in the descending order of similarity. Thus, in a case where a combination commodity item which is the most similar to the sales commodity item is selected, the similar item retrieval unit 22 can easily extract, from the combination commodity items collected from the image medium, the most similar combination commodity item or combination commodity items up to an h-th order (h is set in advance) from the side of high similarity, using FIGS. 15 to 17.

Further, as described above, the control unit 21 compares the reference characteristic vector of each of the sales commodity items with the characteristic data on the combination commodity items collected from the image medium, having a comparison characteristic vector which is in the close distance, to perform clustering in advance, and may calculate the similarity every time, without providing the field where identification information about similar commodity items is written, when the similar combination commodity item is retrieved.

For example, in retrieval of the combination commodity items obtained from the image medium, similar to the sales commodity item in step F3, the similar item retrieval unit 22 may have a configuration of calculating similarity (similarity is increased as the distance of the characteristic vector is short) according to the above-mentioned distance between the reference characteristic vector and the comparison characteristic vector, and extracting a combination commodity item collected from the image medium, having similarity with the sales commodity item.

Here, similarly, in retrieval of the sales commodity items similar to the combination commodity item obtained from the image medium in step F7, the commodity retrieval unit 24 may have a configuration of calculating similarity according to the above-mentioned distance between the reference characteristic vector and the comparison characteristic vector, and extracting the sales commodity item having similarity to the combination commodity item collected from the image medium.

Further, the similar item retrieval unit 22 and the commodity retrieval unit 24 may calculate the distance between the sales commodity item and the combination commodity item collected from the image medium, and may extract the most similar commodity item or commodity items up to the h-th order from the side of high similarity.

As described above, according to the present embodiment, in a case where the user retrieves objects, it is possible to support retrieval by information providing or the like.

For example, as described above, in purchase of a combination commodity, since a commodity which suits in combination with a commodity to be purchased or purchased by a user is extracted from a commodity group which is on sale and the extracted commodity is recommended to the user, the user can easily select the combination commodity without worrying that the combination commodity is suitable when the user selects a suitable commodity from a variety of commodities in a virtual shop on the Internet.

Further, in the above-described embodiment, the usage information is added as one of the attribute information about each commodity item in the combination commodity image information database 29, but the combination commodity image information database 29 may be configured according to each category classification of the usage information. For example, each commodity table for spring, summer, autumn and winter may be configured. In this case, the similar item retrieval unit 22 selects the commodity image information database 29 corresponding to the registration information added to the retrieval request from the user terminal 200, and retrieves a commodity item similar to the commodity item which is requested for retrieval, from the selected commodity image information database 29, thereby making it possible to reduce the retrieval time.

<Third Embodiment>

In the second embodiment, the commodity retrieval support device 100 transmits the sales commodity items to the user terminal 200 by the thumbnail image so that the user performs selection on the screen of the user terminal 200.

In the third embodiment, after the user accesses the virtual shop, the user may input image data on garments which the user desires to purchase, which is read from the image medium through a scanner or the like or is downloaded through the Internet, to the user terminal 200 as image data on commodity items, the user terminal 200 may transmit the image data to the commodity retrieval support device 100, and the commodity retrieval support device 100 may extract a sales commodity item which is similar to a combination commodity item of the image data. An operation after the sales commodity item is extracted is the same as the operation after the user selects the sales commodity item from the thumbnail image in the second embodiment.

The configuration of the commodity retrieval support device 100 according to the third embodiment is the same as in the second embodiment. Hereinafter, an operation which is different from the second embodiment will be described only.

If the user accesses the virtual shop by the user terminal 200, the commodity retrieval support device 100 starts up, and the control unit 21 transmits image information about an input screen (where the user clicks and retrieves options through a mouse or the like) for asking whether to select a sales commodity item from the thumbnail images or to extract a similar sales commodity item from the commodity item database 26 using the image data on garments input by the user, to the user terminal 200.

Further, as the user determines to select a commodity to be purchased from the thumbnail image, if a reply signal indicating the selection through the thumbnail image from the user terminal 200 is input, the control unit 21 adds identification information about sales commodity item to each piece of image data in a similar way to the second embodiment, and transmits the thumbnail images of a plurality of sales commodity items to the user terminal 200. After the user selects any one of the thumbnail images, the same process as in the second embodiment is performed.

On the other band, if the user selects extraction of the similar sales commodity item from the commodity item database 26 using the image data input by the user, the user terminal 200 transmits a reply signal indicating the selection through the image data input by the user to the commodity retrieval support device 100. Thus, the control unit 21 transmits information about the input screen where the image data is input to the user terminal 200.

The user reads in image data on garments which the user desires to purchase (paper image medium such as a fashion magazine, fashion catalogue or the like) to the user terminal 200 using a scanner or captures the image data using a digital camera, to read in the captured image data or the image data obtained by the Internet to the user terminal 200.

Figure 21:
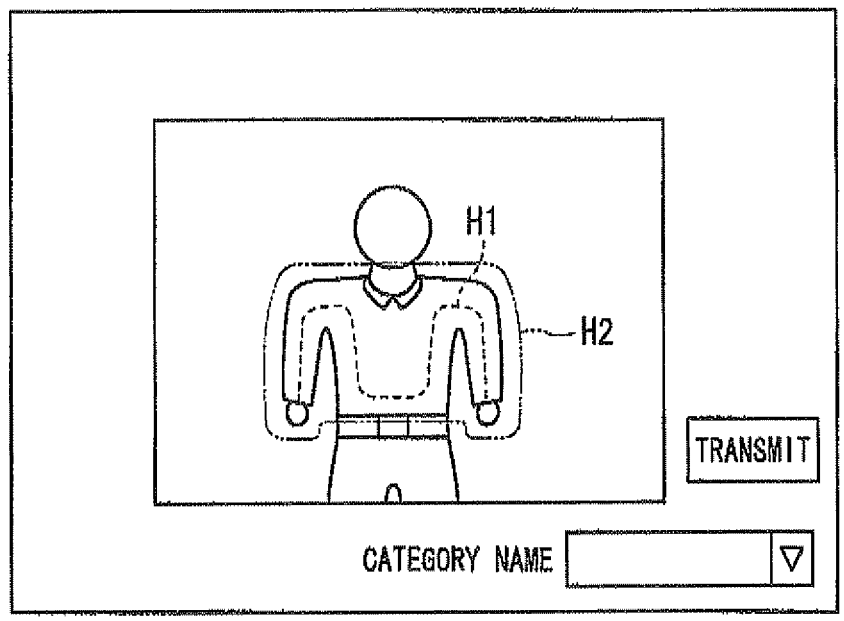
FIG. 21 is a conceptual diagram illustrating segmentation of image data through a graph cut technique.

If the image data is read in, the image data is displayed on a display unit as shown in FIG. 21 in an image data display region the input screen in the user terminal 200, and the user selects a region of a garment of the image data which the user would like to purchase, for example, a shirt part which the user desires to extract by a broken line H1, and surrounds an outer periphery (part in the vicinity of the outer periphery of the shirt) of the shirt part which the user desires to extract by a broken line H2, and thus, the user selects a background image part of the entire shirt part which the user desires to extract. Further, on the display screen of the display unit of the user terminal 200, the user selects a category name from a list of categories (for example, shirt) of a combo box and clicks a transmission button on the display screen, and thus, the user terminal 200 detects that a process of transmission-processing the image data is requested, and transmits the image data on the garment drawn by the broken lines H1 and H2, image data on a garment which is not drawn by the broken lines H1 and H2, category information indicating the category name of the selected garment to the commodity retrieval support device 100.

Further, if the image data on the garment which is drawn by the broken lines H1 and H2 and the image data on the garment which is not drawn by the broken lines H1 and H2 are received, the control unit 21 performs a segmentation process of the shirt part and the part other than the shirt part by the graph-cut method for the image data on the garment to extract the shirt part.

That is, the control unit 21 performs the segmentation by calculating a boundary between a region having the same pixel value as that of pixels on the broken line H1 drawn in the shirt part and a region having the same pixel value as that of pixels on the broken line H2 drawn in the part other than the shirt part as a position where an error of an error function according to gradient is minimum, to thereby perform the segmentation.

Here, if the shirt part is extracted, as described above, the control unit 21 performs the two-dimensional Fourier transform, extracts shape data which is an element in characteristic data, and outputs the result as detection target characteristic data.

Further, the control unit 21 selects a table corresponding to the category of the extracted garment, for example, the shirt table in the present embodiment from the commodity item database 26.

After the shirt table is selected, the control unit 21 calculates the distance between a reference characteristic vector including characteristic data on each sales commodity item of the table and a target characteristic vector including the detection target characteristic data, and extracts sales commodity items having characteristic data which is similar to the detection target characteristic data, which is less than or equal to a preset distance, from the shirt table up to a higher h-th order which is determined to be similar thereto, for example, up to a higher fifth order. Here, since it is difficult to extract a texture from the image data transmitted from the user in the characteristic data, when the characteristic vector is generated from the characteristic data, the control unit 21 calculates the distance of the compared characteristic vectors, by excluding the texture from the element of the vector.

Next, the control unit 21 reads out the image data on each sales commodity item from the sales item image database 27, transmits the image data to the user terminal 200 as a thumbnail image, corresponding to each piece of identification information, based on the identification information of the higher fifth article. The subsequent processes are the same as the processes after the thumbnail image is transmitted in step F2 in the flowchart of FIG. 18 according to the second embodiment.

<Fourth Embodiment>

In the third embodiment, the process of retrieving the sales commodity item which is the same as or similar to the image data on the commodity item input by the user from the commodity item database 26 which stores the sales commodity items which are on sale, presenting the retrieved sales commodity item to the user, and recommending the sales commodity item in the different category which is combined with the retrieved sales commodity item is performed.

In the fourth embodiment, the operation of retrieving the sales commodity item which is combined with the garment which is already possessed by the user is performed.

The user captures the garment possessed by the user, for example, a shirt using a digital camera, and reads in image data on the shirt from the digital camera using the user terminal 200.

Further, if the user accesses a virtual shop by the user terminal 200, the commodity retrieval support device 100 starts up, and the control unit 21 transmits image information about an input screen (where the user clicks and retrieves options through a mouse or the like) for asking whether to select a sales commodity item from thumbnail images, to extract a similar sales commodity item from the commodity item database 26 using the image data on the garment input by the user, or to recommend a sales commodity item which is combined with the garment of the image data input by the user, to the user terminal 200.

Further, as the user determines to select a commodity to be purchased from the thumbnail images, if a reply signal indicating the selection through the thumbnail images from the user terminal 200, in a similar way to the second embodiment, the control unit 21 adds identification information about a sales commodity item to each image data, and transmits the thumbnail images of the plurality of sales commodity items to the user terminal 200. Then, after the user selects any one of the thumbnail images, the same processes as in the second embodiment are performed.

On the other hand, if the user selects extraction of the sales commodity item from the commodity item database 26 by the image data input by the user, the user terminal 200 transmits a reply signal indicating the selection through the image data input by the user to the commodity retrieval support device 100. The subsequent processes are the same as the processes in the third embodiment.

Further, if the user selects recommendation of the sales commodity item in the different category which is combined with the image data input by the user, the user terminal 200 transmits a reply signal indicating the selection of recommendation of the sales commodity item which is combined with the garment of the image data input by the user to the commodity retrieval support device 100.

Hereinafter, the process of recommending the sales commodity item which is combined with the garment of the image data input by the user, according to the fourth embodiment, will be described. The configuration of the commodity retrieval support device 100 according to the fourth embodiment is the same as in the second embodiment. Hereinafter, only operations which are different from the first and third embodiments will be described.

As described above, if the user selects recommendation of the sales commodity item which is combined with the garment of the image data input by the user, the user terminal 200 transmits the reply signal indicating the recommendation of the sales commodity item which is combined with the garment of the image data input by the user to the commodity retrieval support device 100. Thus, the control unit 21 transmits information about an input screen through which image data and usage information is input to the user terminal 200.

The user captures image data on the garment (for example, shirt) possessed by the user, which the user would like to recommend as a sales commodity item to be combined, using an imaging device such as a digital camera, and reads in the image data obtained by capturing the garment from the imaging device to the laser terminal 200.

If the image data read by the user terminal 200 is displayed on the display unit, the user selects a category of the garment of the image data displayed in the image data display region from a combo box, and inputs the selected category in a category input field in the vicinity of the image data display region. Further, the user selects usage information which is in the vicinity of the image data display region on the display unit of the user terminal 200 from the combo box, and inputs the selected usage information.

Further, if the user selects a transmission button on the input screen using a pointing device such as a mouse, the user terminal 200 detects that the process of transmission-processing image data is requested, and transmits the image data displayed in the image data display region together with the category information indicating the category and the usage information to the commodity retrieval support device 100.

If the image data is input, the control unit 21 performs the two-dimensional Fourier transform for the garment of the image data, for example, the image data on the shirt, extracts shape data which is an element in characteristic data, and outputs the result together with the category information to the similar item retrieval unit 22 as detection target characteristic data. Further, the control unit 21 outputs the supplied usage information together with the image data and the category information to the condition setting unit 32. Thus, the condition setting unit 32 sets therein the usage information used when similar commodity items are retrieved, and outputs the set usage information to the similar item retrieval unit 22.

Further, the similar item retrieval unit 22 selects a table corresponding to the category of the extracted garment, for example, the shirt table from the combination commodity image information database 29.

After the shirt table is selected, the similar item retrieval unit 22 calculates the distance between a reference characteristic vector including characteristic data on each combination commodity item of the table and a target characteristic vector including the detection target characteristic data, and extracts combination commodity items having characteristic data which is similar to the detection target characteristic data, which is less than or equal to a preset distance, from the shirt table up to a higher h-th in the ascending order of distance, which has usage information identical to the usage information set by the condition setting unit 32 and is determined to be similar thereto, for example, combination commodity items up to a higher fifth order. Here, since it is difficult to extract a texture from the image data transmitted from the user in the characteristic data, when the characteristic vector is generated from the characteristic data, the control unit 21 calculates the distance of the compared characteristic vectors, by excluding the texture from the element of the vector.

Further, the similar item retrieval unit 22 outputs the combination commodity items up to the higher fifth order in detected similarity, for example, five pieces of identification information about the shirt to the combination retrieval unit 23.

If the identification information about the combination commodity items is input, the combination retrieval unit 23 reads out identification information about combination commodity items of a different category such as trousers which is stored corresponding to each of five pieces of identification information about the input combination commodity items, in the combination information database 28.

Next, the combination retrieval unit 23 transmits each combination of identification information in five combinations of the shirt and trousers to the control unit 21. The subsequent processes are the same as the processes after step F5 in the flowchart of FIG. 18.

<Fifth Embodiment>

Attribute information of image data on old garments collected from old fashion magazines, fashion catalogues or the like in the past such as 10 years ago, 20 years ago or the like may be stored in the combination commodity image information database 29, corresponding identification information.

Further, the image data on the old garments is stored in the combination commodity image database 30, corresponding to the identification information.

Further, in accordance with a combination of combination commodity items in the old fashion magazines, fashion catalogues or the like, a combination table of combination commodity items between different categories shown in FIG. 14 is created in the combination information database 28.

As described above, by configuring the combination commodity image information database, the combination commodity image database 30 and the combination information database 28, when a new sales commodity item similar to the old design is on sale, it is possible to easily extract a sales commodity item combined with the new combination commodity item similar to the old design from sales commodity items which are currently on sale, using the combination in the old design.

In the present embodiment, the garment has been described as a commodity item, but the invention can be easily applied to combination commodities obtained by combining a plurality of commodities of different types (categories), for example, overall commodities such as combination furniture or combination electrical appliances.

In the embodiments, the commodity retrieval support process may be performed by recording a program for realizing the functions of the units of the retrieval servers 1 and 1a and the commodity retrieval support device 100 in a computer-readable recording medium and reading in the program recorded in the recording medium in a computer system to be executed. Here, it is assumed that the "computer system" includes hardware such as an OS, peripheral devices or the like. Further, it is assumed that the "computer system" includes the WWW system including a homepage providing environment (display environment). Further, the "computer-readable recording medium" refers to a transportable medium such as a flexible disk, a magneto-optical disc, a ROM or a CD-ROM, and a storage device such as a hard disk which is installed in the computer system. Further, it is assumed that the "computer-readable recording medium" includes a storage medium which maintains a program for a certain period of time, such as a volatile memory (RAM) inside a computer system which is a server or a client in a case where the program is transmitted through a network such as the Internet or a communication line such as a telephone line.

Further, the program may be transmitted to a different computer system through a transmission medium or by a transmission wave in, the transmission medium from the computer system which stores the program in a storage device or the like. Here, the "transmission medium" which transmits the program refers to a medium which has a function of transmitting information, such as a network (communication network) such as the Internet or a communication line such as a telephone line. Further, the program may realize a part of the above-mentioned functions. Further, the program may be a program which is able to realize the above-mentioned functions in combination with a program which is already stored in the computer system, that is, a so-called differential file (differential program).

INDUSTRIAL APPLICABILITY

The present invention is appropriately used for a retrieval support system which supports, when a user retrieves an object through the Internet, selection or determination of the object to be retrieved, or for a similar technique, trough which the user can retrieve the object which the user desires to retrieve using image data on the object.

What is claimed is:

1. A retrieval support system comprising:
a server configured to
transmit information to and receive information from at least one user terminal;
store first characteristic information in a commodity database about commodity items acquired from an image medium, each of the commodity items belonging to a category, the first characteristic information being obtained by converting elements acquired from the image medium into numeric data;
store information in a combination information database about combinations of at least one of the commodity items and a combination commodity item, the combination commodity item having a likelihood of being combined for use with the at least one of the commodity items and being included in a different category than the at least one of the commodity items;

store first attribute information in a commodity sales database relating to a group of the commodity items that are for sale;

receive input image data;

extract a contour of an image region of a desired commodity item in the input image data by performing a differential operation that calculates a difference between adjacent pixels in the input image data:

generate contour image data based on the extracted contour, the contour image data including second characteristic information, the second characteristic information being obtained by converting the elements from the input image data into the numeric data;

calculate a difference between the second characteristic information and the first characteristic information to determine a descending order of similarity between the desired commodity item and the commodity items stored in the commodity database based on an increasing difference between the second characteristic information and the first characteristic information;

select, from the commodity database, a candidate group of a predetermined number of the commodity items most similar to the desired commodity item in accordance with the descending order of similarity based on the contour image data and second attribute information about the contour image data, the contour image data representing a portion of an image input by a user, via the at least one user terminal, that corresponds to the desired commodity item, desired by the user, in the image;

retrieve, from the combination information database, the combination commodity item for each of the commodity items in the candidate group of the commodity items;

retrieve image data on the group of the commodity items that are for sale and are in the predetermined number of commodity items most similar to the combination commodity item in accordance with the descending order of similarity in one combination, selected by the user via the at least one user terminal, from the combinations of the at least one of the commodity items and the combination commodity item stored in the combination information database, according to the first attribute information about the image data of the combination commodity item of the user- selected combination and the group of the commodity items that are for sale, and output the retrieved image data as a recommended commodity;

set a retrieval condition including at least one of time information relating to time, place information relating to places, and occasion information relating to occasions, wherein retrieval of at least one of (i) the candidate group of the commodity items, (ii) the combination commodity item for each of the commodity items in the candidate group of the commodity items, and (iii) the image data on the group of the commodity items that are for sale and are in the predetermined number of commodity items most similar to the combination commodity item in accordance with the descending order of similarity in the one combination selected by the user is additionally based on the retrieval condition.

2. The retrieval support system according to claim 1, wherein the server is further configured to display, if a category of the desired commodity item is input by the user via the at least one user terminal, the desired commodity item in the category as a thumbnail image.

3. The retrieval support system according to claim 1,
wherein the predetermined number of the commodity items of the candidate group of the commodity items most similar to the desired commodity item in accordance with the descending order of similarity, which are selected based on the contour image data, are grouped according to a type, and are stored in the commodity database, and
wherein the server is further configured to extract candidate commodity items included in a same group as that of the desired commodity item as the commodity item candidate group.

4. The retrieval support system according to claim 1,
wherein the first attribute information is stored in the commodity database corresponding to each item of the predetermined number of the commodity items of the candidate group of the commodity items most similar to the desired commodity item in accordance with the descending order of similarity, which are selected based on the contour image data, and
wherein the server is further configured to retrieve a commodity item from the predetermined number of most similar commodity items from the commodity database in accordance with the descending order of similarity, according to the first attribute information about the commodity item of the one combination selected by the user, and extract a retrieval result as the commodity item candidate group.

5. The retrieval support system according to claim 1,
wherein commodity items which are in the predetermined number of commodity items most similar to the commodity items in the commodity database in accordance with the descending order of similarity are correspondingly stored in the commodity sales database, and
wherein the server is further configured to extract a commodity item which is for sale and is one of the predetermined number of commodity items most similar to the combination commodity item in accordance with the descending order of similarity in the combination selected by the user, as the recommended commodity.

6. The retrieval support system according to claim 1,
wherein commodity items corresponding to the commodity database are stored in the commodity sales database according to the type of each commodity item, corresponding to the first attribute information, and
wherein the server is further configured to retrieve a commodity item which is for sale and having a highest similarity in accordance with the descending order of similarity from the commodity sales database, according to the first attribute information about the combination commodity item selected by the user, and extract the retrieval result as the recommended commodity.

7. The retrieval support system according to claim 2, the server further comprising:
a purchase history database which stores a first commodity item, purchased by the user via the at least one user terminal, corresponding to an identification signal for identifying the user, wherein the server is configured to (i) assign an identification signal to the user who purchases a first combination commodity item, and (ii) store a first recommended commodity item and information indicating whether or not the user purchases the first commodity item in the purchase history database, corresponding to the identification signal.

8. The retrieval support system according to claim 7, wherein when the server receives a user selection of the first commodity item, via the at least one user terminal, and the first recommended commodity item which is one of the predetermined number of commodity items most similar to the first commodity item in accordance with the descending order of similarity is not purchased, the server is configured to notify the user that the first recommended commodity item is well combined with the first combination commodity item purchased by the user.

9. The retrieval support system according to claim 7, wherein when (i) the server receives a user selection of the first commodity item, via the at least one user terminal, and (ii) the first recommended commodity item, which is purchased from among the recommended commodity items stored in the purchase history database, is one of the predetermined number of commodity items most similar to the first commodity item in accordance with the descending order of similarity, the server is configured to notify the user that the first recommended commodity item is one of the predetermined number of commodity items most similar to the first commodity item in accordance with the descending order of similarity.

10. The retrieval support system according to claim 1, wherein the commodity item corresponds to a garment, and
wherein the retrieval support system is configured to output an image in which a person wears the garment, the image being obtained by synthesizing a human image corresponding to at least one of a plurality of body forms and an image of the garment.

11. A retrieval support method comprising:
receiving, via a server configured to transmit information to and receive information from at least one user terminal, input image data;
extracting, via the server, a contour of an image region of a desired commodity item in the input image data by performing a differential operation that calculates a difference between adjacent pixels in the input image data;
generating via the server, contour image data based on the extracted contour, the contour image data including first characteristic information, the first characteristic information being obtained by converting the elements from the input image data into numeric data;
calculating, via the server, a difference between the first characteristic information and second characteristic information to determine a descending order of similarity between the desired commodity item and commodity items based on an increasing difference between the second characteristic information and the first characteristic information, the second characteristic information being information about commodity items acquired from an image medium, each of the commodity items belonging to a category, the first characteristic information being obtained by converting elements acquired from the image medium into numeric data;
selecting, via the server during a similar item retrieval process, a candidate group of a predetermined number of the commodity items which are most similar to the desired commodity item in accordance, with the descending order of similarity based on the contour image data and first attribute information about the contour image data, from a commodity database, which stores the second characteristic information, the contour image data representing a portion of an image input by a user, via the at least one user terminal, that corresponds to the desired commodity item, desired by the user, in the image;
retrieving via the server, during a combination retrieval process, a combination commodity item corresponding to each of the commodity items in the candidate group of the commodity items, which is combined with the respective commodity item, from a combination information database which stores information about combinations of each of the commodity items in the candidate group of the commodity items with the combination commodity item, and which is combined for use with the respective commodity item and is included in a different category;
retrieving via the server, during a commodity item retrieval process, one of the commodity items which is for sale and is similar to the combination commodity item in one combination, selected by the user via the at least one user terminal, from the combinations of each of the commodity items in the candidate group of the commodity items and the combination commodity item, according to second attribute information about the image data of the combination commodity item of the user-selected combination and the commodity items that are for sale, from a commodity sales database which stores the second attribute information about the commodity item which is for sale, and outputting the retrieved commodity item for sale as a recommended commodity; and
a condition setting process of setting a retrieval condition, via the server, including at least one of time information relating to time, place information relating to places, and occasion information relating to occasions,
wherein in at least one of the similar item retrieval process, the combination retrieval process, and the commodity item retrieval process, retrieval is additionally performed based on the retrieval condition set in the condition setting process.

12. A non-transitory, computer-readable storage medium storing a computer-executable retrieval support program, which causes an operation to be executed in a computer, the operation comprising:
receiving, via a server configured to transmit information to and receive information from at least one user terminal, input image data:
extracting, via the server, a contour of an image region of a desired commodity item in the input image data by performing a differential operation that calculates a difference between adjacent pixels in the input image data;
generating via the server, contour image data based on the extracted contour, the contour image data including first characteristic information, the first characteristic information being obtained by converting the elements from the input image data into numeric data;
calculating, via the server, a difference between the first characteristic information and second characteristic information to determine a descending order of similarity between the desired commodity item and commodity items based on an increasing difference between the second characteristic information and the first characteristic information, the second characteristic information being information about commodity items acquired from an image medium, each of the commodity items belonging to a category, the first characteristic information being obtained by converting elements acquired from the image medium into numeric data;

selecting, via the server during a similar item retrieval process, a candidate group of a predetermined number of the commodity items which are most similar to the desired commodity item in accordance with the descending order of similarity based on the contour image data and first attribute information about the contour image data, from a commodity database, which stores the second characteristic information, the contour image data representing a portion of an image input by a user, via the at least one user terminal, that corresponds to the desired commodity item, desired by the user, in the image;

retrieving via the server, during a combination retrieval process, a combination commodity item corresponding to each of the commodity items in the candidate group of the commodity items, which is combined with the respective commodity item, from a combination information database which stores information about combinations of each of the commodity items in the candidate group of the commodity items with the combination commodity item, and which is combined for use with the respective commodity item and is included in a different category;

retrieving via the server, during a commodity item retrieval process, one of the commodity items which is for sale and is similar to the combination commodity item in one combination, selected by the user via the at least one user terminal, from the combinations of each of the commodity items in the candidate group of the commodity items and the combination commodity item, according to second attribute information about the image data of the combination commodity item of the user-selected combination and the commodity items that are for sale, from a commodity sales database which stores the second attribute information about the commodity item which is for sale, and outputting the retrieved commodity item for sale as a recommended commodity; and a condition setting process of setting a retrieval condition, via the server, including at least one of time information relating to time, place information relating to places, and occasion information relating to occasions, wherein in at least one of the similar item retrieval process, the combination retrieval process, and the commodity item retrieval process, retrieval is additionally performed based on the retrieval condition set in the condition setting process.

13. The non-transitory, computer-readable storage medium of claim 12, wherein the numeric data comprises a vector of dimensions corresponding to a number of the elements, and wherein the server is configured to calculate the difference between the second characteristic information and the first characteristic information by calculating a distance between a vector in each element of the numeric data of the second characteristic information and a vector in each element of the numeric data of the first characteristic information.

14. The retrieval support method of claim 11, wherein the numeric data comprises a vector of dimensions corresponding to a number of the elements, and wherein the server is configured to calculate the difference between the second characteristic information and the first characteristic information by calculating a distance between a vector in each element of the numeric data of the second characteristic information and a vector in each element of the numeric data of the first characteristic information.

15. The retrieval support system of claim 1, wherein the numeric data comprises a vector of dimensions corresponding to a number of the elements, and wherein the server is configured to calculate the difference between the second characteristic information and the first characteristic information by calculating a distance between a vector in each element of the numeric data of the second characteristic information and a vector in each element of the numeric data of the first characteristic information.

* * * * *